United States Patent [19]

Utagawa

[11] Patent Number: 5,528,330
[45] Date of Patent: Jun. 18, 1996

[54] FOCUS DETECTING APPARATUS

[75] Inventor: Ken Utagawa, Yokohama, Japan

[73] Assignee: Nikon Corporation, Tokyo, Japan

[21] Appl. No.: 426,470

[22] Filed: Apr. 20, 1995

Related U.S. Application Data

[63] Continuation of Ser. No. 329,380, Oct. 25, 1994, abandoned, which is a continuation of Ser. No. 229,994, Apr. 19, 1994, abandoned, which is a continuation of Ser. No. 6,834, Jan. 21, 1993, abandoned.

[30]    Foreign Application Priority Data

Jan. 27, 1992  [JP]  Japan .................................. 4-012345

[51] Int. Cl.⁶ .................................................. G03B 13/36
[52] U.S. Cl. ........................ 354/402; 354/408; 358/345; 250/201.2
[58] Field of Search ................................ 354/400, 402, 354/406, 407, 408; 348/345, 349, 350; 250/201.2

[56]            References Cited

U.S. PATENT DOCUMENTS

| | | | |
|---|---|---|---|
| 4,903,065 | 2/1990 | Taniguchi et al. | 354/402 |
| 4,979,045 | 12/1990 | Taniguchi et al. | 354/227 |
| 5,068,682 | 11/1991 | Utagawa | 354/402 |
| 5,068,737 | 11/1991 | Taniguchi et al. | 354/400 |
| 5,089,842 | 2/1992 | Uchiyama et al. | 354/402 |
| 5,121,152 | 6/1992 | Wagner | 384/402 |
| 5,128,705 | 7/1992 | Someya et al. | 354/400 |
| 5,136,325 | 8/1992 | Uchiyama et al. | 354/402 |
| 5,218,395 | 6/1993 | Taniguchi et al. | 354/407 |

FOREIGN PATENT DOCUMENTS

| | | |
|---|---|---|
| 0351855 | 1/1990 | European Pat. Off. . |
| 0416904 | 3/1991 | European Pat. Off. . |
| 0439167 | 7/1991 | European Pat. Off. . |
| 0486302 | 5/1992 | European Pat. Off. . |
| 3928549 | 12/1990 | Germany . |
| 63-246711 | 10/1988 | Japan . |
| 1-279215 | 11/1989 | Japan . |
| 2200010 | 7/1988 | United Kingdom . |

Primary Examiner—Russell E. Adams

[57]            ABSTRACT

A focus detecting apparatus comprises charge accumulation type photoelectric converting devices provided correspondingly to at least three focus detection areas set in a photographing image field and having a plurality of pairs of light receiving portions each for receiving a pair of light beams directed from each of the focus detection areas by a focus detecting optical system, an area setting device for setting a selection area including plural ones of the focus detection areas and a non-selection area including at least one of the focus detection areas in the photographing image field, a processing device for applying different processings to the outputs of the charge accumulation type photoelectric converting devices corresponding to the focus detection areas belonging to the selection area and the output of the charge accumulation type photoelectric converting device corresponding to the focus detection area belonging to the non-selection area, and a focus detecting device for detecting the focus adjusted state of a photo-taking lens on the basis of the outputs of the charge accumulation type photoelectric converting devices corresponding to the focus detection areas belonging to the selection area processed by the processing device.

69 Claims, 22 Drawing Sheets

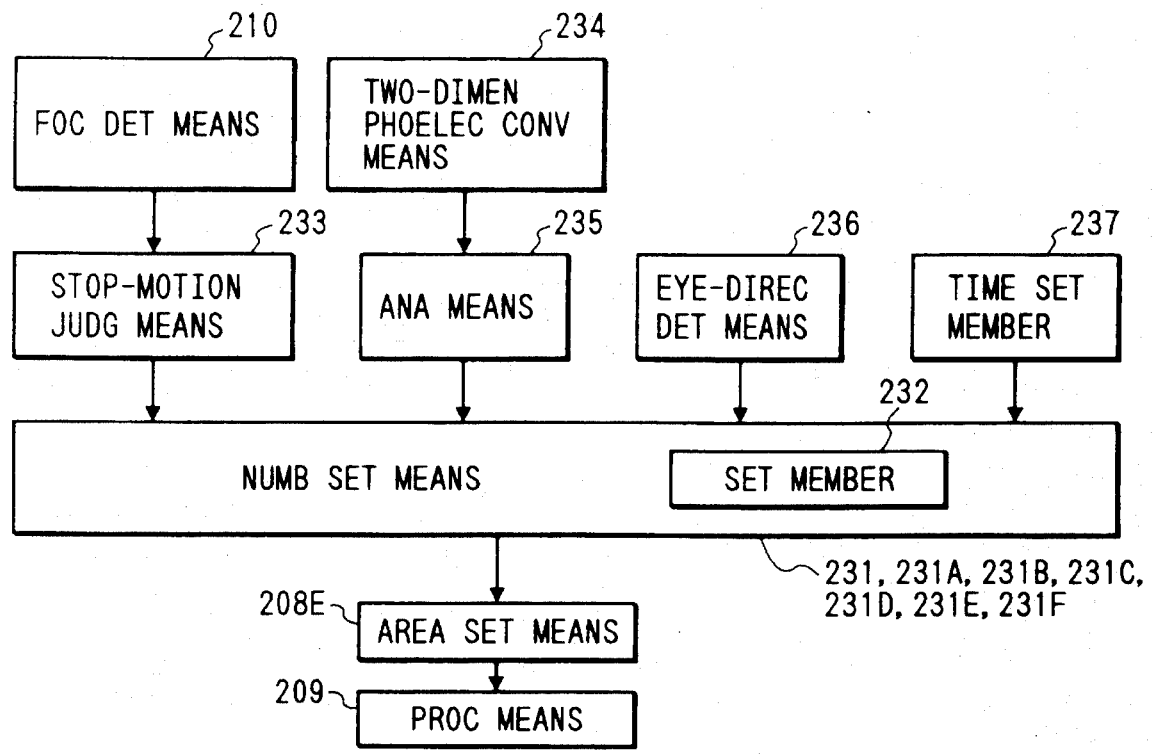
FIG. 4
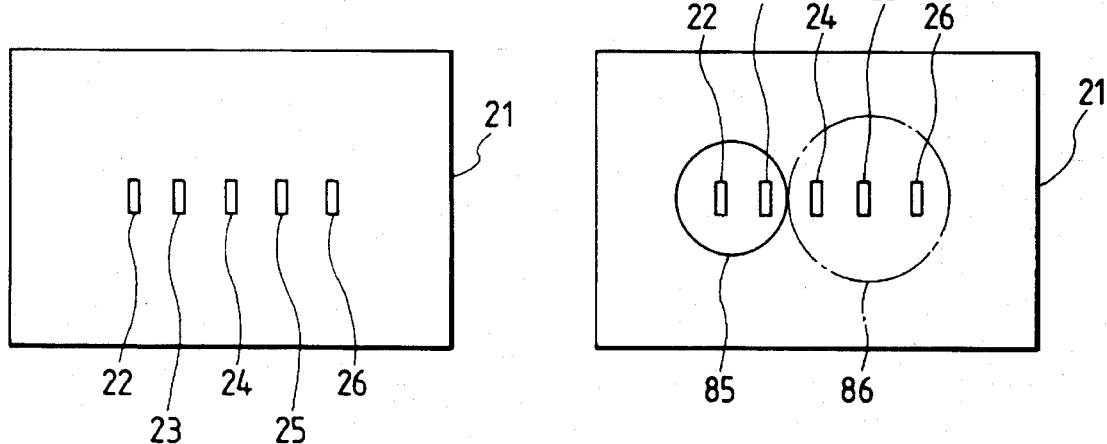
FIG. 6A
FIG. 6B

46~55

56a,56b~65a,65b 56a,56b~65a,65b 66a,66b~75a,75b

FOCUS DETECTING APPARATUS

This application is a continuation of application Ser. No. 08/329,380, filed Oct. 25, 1994, now abandoned, which application was a continuation of application Ser. No. 08/229,994, filed Apr. 19, 1994, now abandoned, which application was a continuation of Ser. No. 08/006,834, filed Jan. 21, 1993, now abandoned.

BACKGROUND OF THE INVENTION

1. Field of the Invention

This invention relates to a focus detecting apparatus for a camera or the like.

2. Related Background Art

There is known a focus detecting apparatus for a camera which is provided with a narrow focus detection area of e.g. about 3 mm in the center of a photographing image field. The focus detecting apparatus of this kind suffers from the following disadvantages.

First, when an object to be photographed by a photographer is at any other location than the center of the photographing image field, the photographer must catch that object in the central focus detection area by changing the direction of the camera and effect focus detection. This leads to bad operability. Second, since the focus detection area is narrow, the object to be photographed will come out of the focus detection area if the photographer slightly changes the direction of the camera.

In order to overcome the above first disadvantage, there has been proposed a focus detecting apparatus in which a plurality of focus detection areas are also provided at other locations than the center of the photographing image field. A camera then automatically selects a focus detection area by a predetermined algorithm to thereby effect focus detection. In such a focus detecting apparatus, however, an area which is not the object of focus by the photographer may be selected and the focus detection of the object in that area may be effected in some cases.

There has also been proposed a focus detecting apparatus designed such that from among a plurality of focus detection areas disposed at intervals in the photographing image field, the photographer manually selects an area to thereby effect focus detection. However even such a focus detecting apparatus cannot overcome the above-noted second disadvantage.

Further, if the number of focus detection areas is increased, an object can be caught in a wide range in the image field, while there is the disadvantage that focus detection time becomes long.

SUMMARY OF THE INVENTION

It is an object of the present invention to provide a focus detecting apparatus in which a plurality of focus detection areas are provided in the photographing image field and which reliably catch an object intended by the photographer in a wide range in the image field and effects focus detection within a short time.

BRIEF DESCRIPTION OF THE DRAWINGS

FIGS. 1 to 4 are diagrams for illustrating embodiments of the present invention.

FIGS. 6A and 6B illustrate an embodiment in which five focus detection areas are set in the photographing image field.

DESCRIPTION OF THE PREFERRED EMBODIMENTS

Embodiments of the present invention will hereinafter be described with reference to the drawings.

Figure 1:
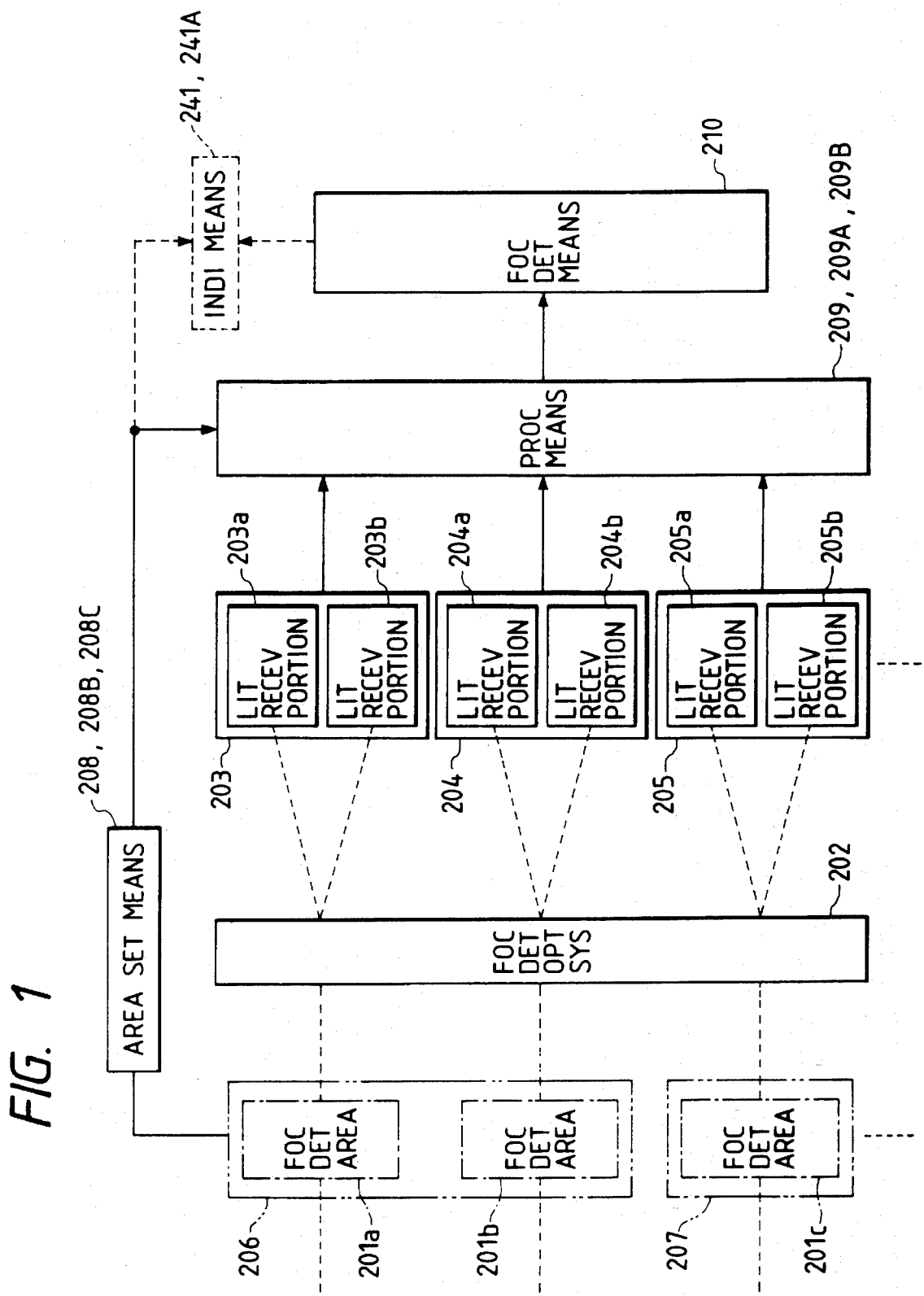

An embodiment of the present invention shown in FIG. 1 will first be described. This embodiment is provided with charge accumulation type photoelectric converting means 203–205 . . . provided correspondingly to three or more focus detection areas 201a–201c . . . set in the photographing image field and having a plurality of pairs of light receiving portions (203a, 203b), (204a, 204b), (205a, 205b) . . . for receiving a pair of light beams directed from the focus detection areas 201a–201c . . . by a focus detecting optical system 202. The embodiment is also provided with area setting means 208 for setting a selection area 206 including a plurality of focus detection areas 201a and 201b and a non-selection area 207 including at least one focus detection area 201c in the photographing image field, processing means 209 for applying different processings to the outputs of the charge accumulation type photoelectric converting means 203 and 204 corresponding to the focus detection areas 201a and 201b belonging to the selection area 206 and the output of the charge accumulation type photoelectric converting means 205 corresponding to the focus detection area 201c belonging to the non-selection area 207, and focus detecting means 210 for detecting the focus adjusted state of a photo-taking lens on the basis of the result of the processings of the outputs of the charge accumulation type photoelectric converting means 203 and 204 belonging to the selection area 206 by the processing means 209.

The processing means 209A of the focus detecting apparatus of another embodiment is designed to memorize the outputs of at least the charge accumulation type photoelectric converting means 203 and 204 belonging to the selection area 206. Processing means 209A and also calculates the amount of image shift except when the calculation of image shift is impossible due to a deficiency or the like of the clear-cutness of images on the pairs of light receiving portions (203a, 203b), (204a, 204b) of the charge accumulation type photoelectric converting means 203, 204 belonging to the selection area 206.

The processing means 209B of the focus detecting apparatus of another embodiment is designed to calculate the next charge accumulation time on the basis of the output value and charge accumulation time of the charge accumulation type photoelectric converting means for a focus detection area in the focus detection area 201c belonging to the non-selection area 207 which may be included in the selection area next time.

Figure 2:
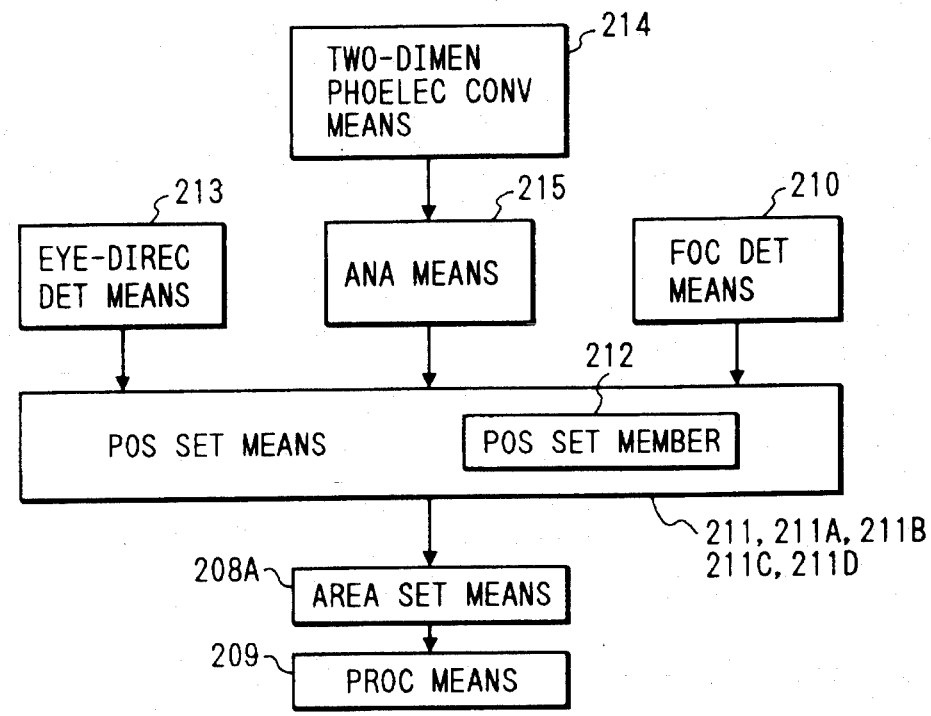

An embodiment of the present invention shown in FIG. 2 will now be described. This embodiment is provided with position setting means 211 for setting the position of the selection area in the photographing image field, and area setting means 208A is designed to set the selection area in the photographing image field on the basis of the position of the selection area set by the position setting means 211.

The position setting means 211A of the focus detecting apparatus of another embodiment has a position setting member 212 capable of arbitrarily setting the position of the selection area in the photographing image field.

The focus detecting apparatus of another embodiment is provided with eye-direction detecting means 213 for detecting at which position of a finder screen the photographer's eye direction is gazing and position setting means 211B is designed to set the position of the selection area on the basis of the photographer's eye direction detected by the eye-direction detecting means 213.

The focus detecting apparatus of another embodiment is provided with two-dimensional photoelectric converting means 214 for receiving a light beam from an object passed through a photo-taking lens, and analyzing means 215 for analyzing the output of the two-dimensional photoelectric converting means 214 and detecting the movement of the object in the photographing image field, and position setting means 211C is designed to set the position of the selection area on the basis of the movement of the object detected by the analyzing means 215.

The position setting means 211D of the focus detecting apparatus of another embodiment is designed to set the next position of the selection area on the basis of the position of the focus detection area which is most related to the result of the focus detection by the focus detecting means 210.

An embodiment of the present invention shown in FIG. 1 will now be described. The area setting means 208B of the focus detecting apparatus of this embodiment is designed to renew the selection area at a predetermined period and to set the current selection area so that at least one common focus detection area included in both of the last and current selection areas may exist when the current selection area is to be set at a position adjacent to the selection area set the last time.

The area setting means 208C of the focus detecting apparatus of another embodiment is designed to set the selection area so as to include a plurality of focus detection areas in which the directions of focus detection are not parallel to one another.

Figure 3:
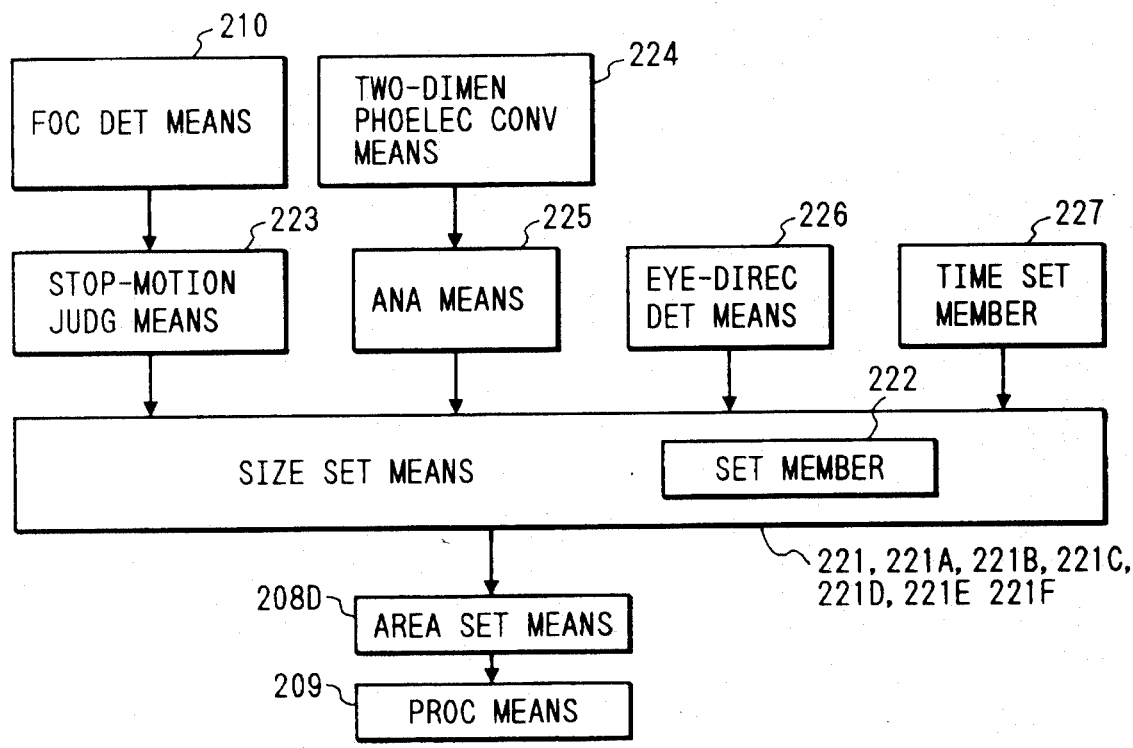

An embodiment of the present invention shown in FIG. 3 will now be described. The focus detecting apparatus of this embodiment is provided with size setting means 221 for setting the size of the selection area, and area setting means 208D designed to set the selection area in accordance with the size set by the size setting means 221.

The size setting means 221A of the focus detecting apparatus of another embodiment has a setting member 222 for setting the size of the selection area.

The focus detecting apparatus of another embodiment is provided with stop-motion judging means 223 for judging the stop or motion of the object on the basis of the result of the detection by the focus detecting means 210, and size setting means 221B is designed to set the size of the selection area on the basis of the result of the judgment by the stop-motion judging means 223.

The focus detecting apparatus of another embodiment is provided with two-dimensional photoelectric converting means 224 for receiving a light beam from the object passed through the photo-taking lens, and analyzing means 225 for analyzing the output of the two-dimensional photoelectric converting means 224 and detecting any variation in the size of the object in the photographing image field and the movement of the object. Size setting means 221C is designed to set the size of the selection area on the basis of the variation in the size of the object and the movement of the object detected by the analyzing means 225.

The focus detecting apparatus of another embodiment is provided with eye-direction detecting means 226 for detecting at which portion of the finder screen the photographer's eye is gazing, and size setting means 221D is designed to set the size of the selection area on the basis of the result of the eye-direction detection by the eye-direction detecting means 226.

The size setting means 221E of the focus detecting apparatus of another embodiment is designed to set the size of the selection area in conformity with the focal length of the photo-taking lens.

The focus detecting apparatus of another embodiment is provided with a time setting member 227 for setting the time permitted for focus detection, and size setting means 221F is designed to set the size of the selection area so that focus detection may be completed by the focus detecting means 210 within the time set by the time setting member 227.

An embodiment of the present invention shown in FIG. 4 will now be described. The focus detecting apparatus of this embodiment is provided with number setting means 231 for setting the number of focus detection areas included in the selection area, and area setting means 208E designed to set the selection area so as to include the number of focus detection areas set by the number setting means 231.

The number setting means 231A of the focus detecting apparatus of another embodiment has a setting member 232 for setting the number of focus detection areas included in the selection area.

The focus detecting apparatus of another embodiment is provided with stop-motion judging means 233 for judging the stop or motion of the object on the basis of the result of the judgment by the focus detecting means 210. Number setting means 231B is designed to set the number of focus detection areas included in the selection area on the basis of the result of the judgment by the stop-motion judging means 233.

The focus detecting apparatus of another embodiment is provided with two-dimensional photoelectric converting means 234 for receiving the light beam from the object passed through the photo-taking lens, and analyzing means 235 for analyzing the output of the two-dimensional photoelectric converting means 234 and detecting any variation in the size and the movement of the object in the photographing image field. Number setting means 231C is designed to set the number of focus detection areas included in the selection area on the basis of the variation in the size and the movement of the object detected by the analyzing means 235.

The focus detecting apparatus of another embodiment is provided with eye-direction detecting means 236 for detecting at which portion of the finder screen the photographer's eye is gazing. Number setting means 231D is designed to set the number of focus detection areas included in the selection area on the basis of the result of the eye-direction detection by the eye-direction detecting means 236.

The number setting means 231E of the focus detecting apparatus of another embodiment is designed to set the number of focus detection areas included in the selection area in conformity with the focal length of the photo-taking lens.

The focus detecting apparatus of another embodiment is provided with a time setting member 237 for setting the time permitted for focus detection. Number setting means 231F is designed to set the number of focus detection areas included in the selection area so that focus detection may be completed by the focus detecting means within the time set by the time setting member 237.

An embodiment of the present invention shown in FIG. 1 will now be described. The focus detecting apparatus of this embodiment is provided with indicating means 241 for indicating the selection area 206 in the photographing image field.

The indicating means 241A of the focus detecting apparatus of another embodiment is designed to indicate one of the plurality of focus detection areas 201a and 201b in the selection area 206 which is most related to the result of the focus detection by the focus detecting means 210.

The focus adjusted state of the photo-taking lens is detected on the basis of the result of the processing of the outputs of the charge accumulation type photoelectric converting means 203 and 204 corresponding to the plurality of focus detection areas 201a and 201b belonging to the selection area 206. Thereby, even if many focus detection areas are set to effect focus detection in a wide range in the photographing image field, the focus detecting process is carried out only for the focus detection area in the selection area which catches the object. Therefore, focus detection can be effected within a short time.

With reference to FIG. 4, the selection area is set by the area setting means 208A on the basis of the position of the selection area in the photographing image field set by the position setting means 211. Thereby, focus detection can be effected with an intended object being reliably caught in the selection area.

The selection area is set by the area setting means 208D in accordance with the size set by the size setting means 221. Thereby, focus detection can be effected with whatever object being reliably caught in the selection area.

The selection area is set by the area setting means 208E so that the number of focus detection areas set by the number setting means 231 may be included therein. Thereby, focus detection can be effected with whatever object being reliably caught in the selection area.

First Embodiment

Figure 5:
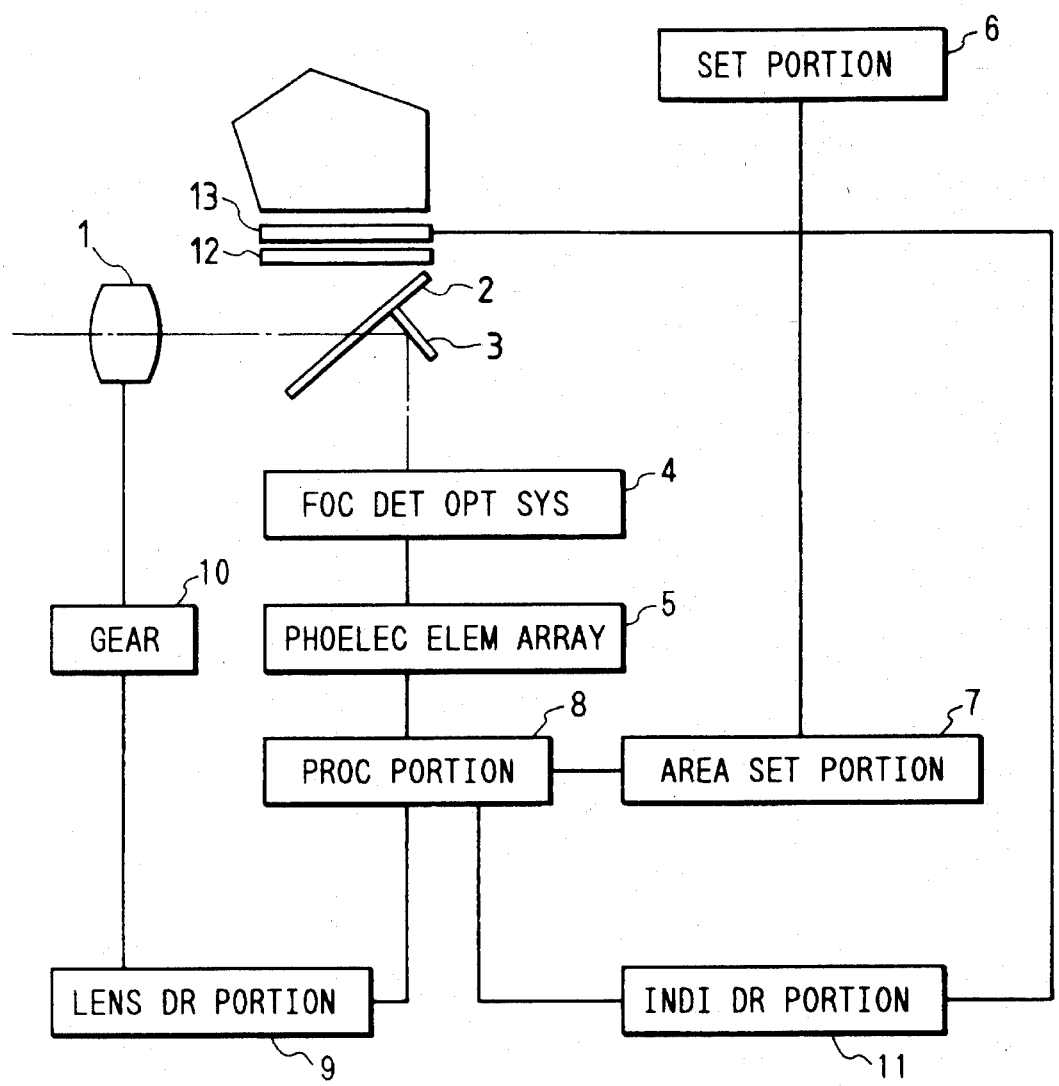
FIG. 5 is a block diagram illustrating the construction of a first embodiment of the present invention.

FIG. 5 is a block diagram illustrating the construction of a first embodiment.

A part of a light beam from an object incident on a photo-taking lens 1 passes through a main mirror 2, and is reflected by a sub-mirror 3, and is directed to a focus detecting optical system 4. In this embodiment, at least three focus detection areas are set in the photographing image field. A charge accumulation type photoelectric element array 5 is provided correspondingly to each of these focus detection areas. Array 5 receives the light beam from the object in each focus detection area and outputs an electrical signal conforming to the light intensity distribution thereof.

A setting portion 6 sets the position of the selection area in the photographing image field. Although this setting method will be described later, there are a case where the photographer manually sets by a setting member and a case where the camera automatically judges and sets by a predetermined algorithm. An area setting portion 7 sets a selection area including a plurality of focus detection areas and a non-selection area including at least one focus detection area in the photographing image field on the basis of the position of the selection area set by the setting portion 6. A processing portion 8 effects a well-known focus detection calculation on the basis of the output signal of the photoelectric element array 5, corresponding to the focus detection areas included in the selection area. Element array 5 detects the focus adjusted state of the photo-taking lens 1 for each of those focus detection areas, and calculates the direction and amount of lens driving. In this first embodiment, no processing is effected on the output signal of the photoelectric element array 5 corresponding to the focus detection area included in the non-selection area. That is, a focus detection calculating process is carried out for the selection area and nothing is done for the non-selection area.

A lens driving portion 9 drives the photo-taking lens 1 through a gear 10 in accordance with the direction and amount of lens driving. An indicator driving portion 11 drives an indicating portion 13 provided on a screen mat 12 to thereby indicate the set selection area and the focus detection areas included in the selection area.

Figure 7:
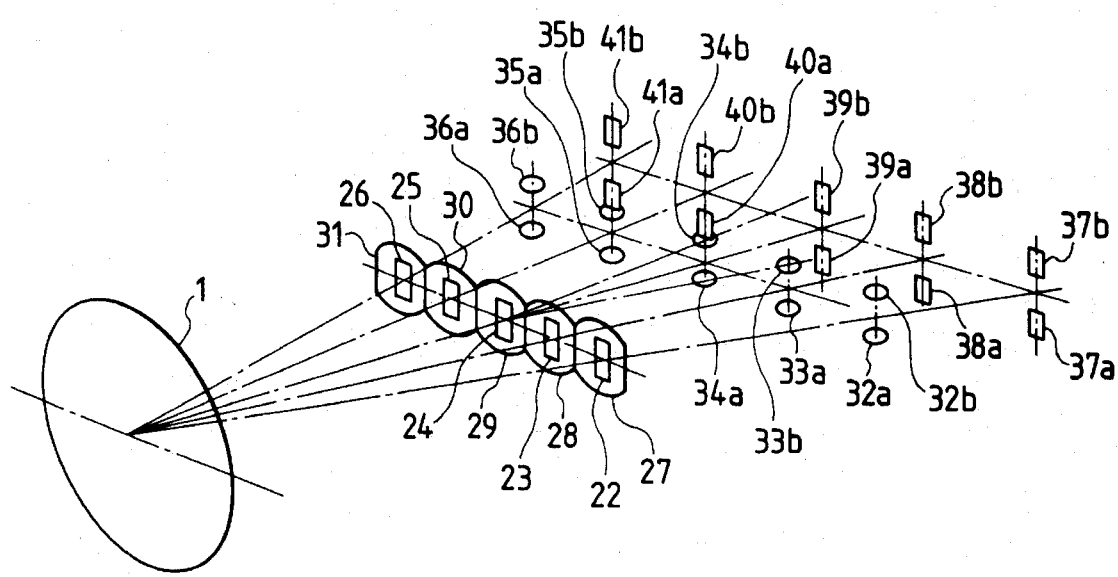
FIG. 7 illustrates a focus detecting optical system corresponding to the five focus detection areas in the photographing image field shown in FIG. 6.
Figure 8:
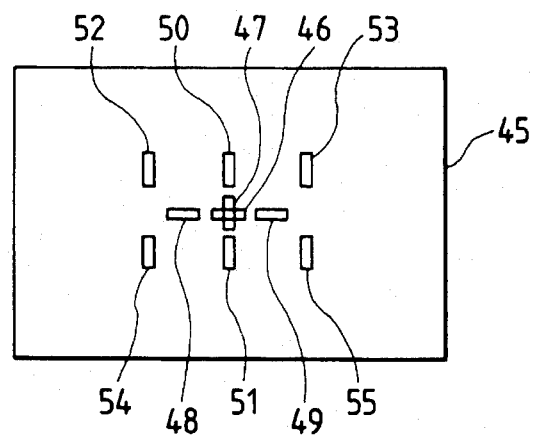
FIG. 8 illustrates an embodiment in which ten focus detection areas are set in the photographing image field.

FIG. 6A illustrates an embodiment in which five focus detection areas are set in the photographing image field, and FIG. 7 illustrates the focus detecting optical system thereof. FIG. 8 illustrates another embodiment in which ten focus detection areas are set in the photographing image field, and FIGS. 9A and 9B illustrate the focus detecting optical system thereof.

The focus detecting optical system shown in FIG. 7, corresponding to the five focus detection areas 22–26 in the photographing image field 21 shown in FIG. 6A, is provided with five field lenses 27–31 near the predetermined imaging plane of the photo-taking lens 1, five pairs of re-imaging lenses 32a, 32b–36a, 36b rearwardly thereof, and five pairs of photoelectric element arrays 37a, 37b–41a, 41b.

Figure 9A:
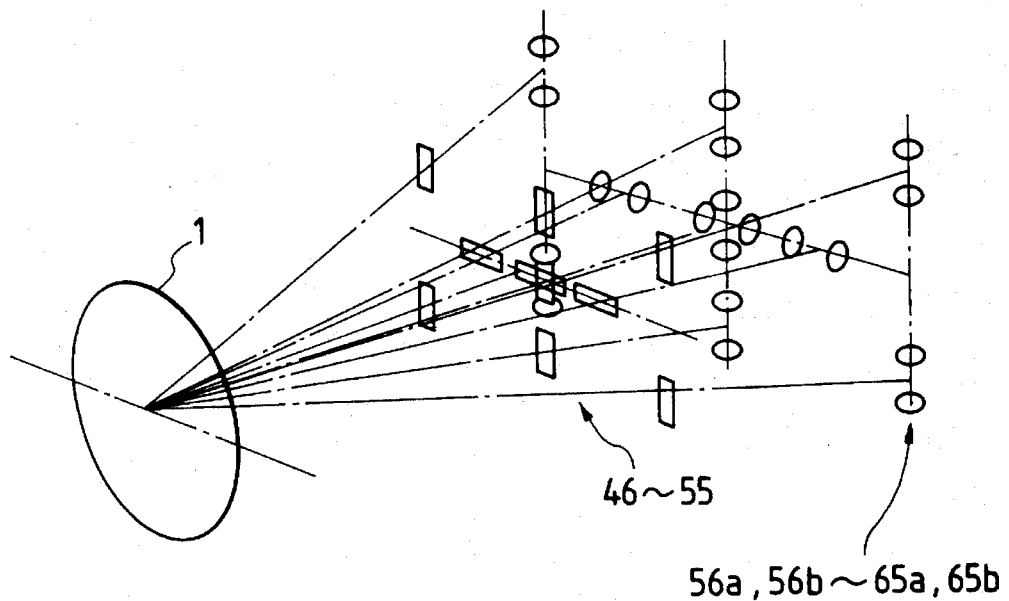
FIGS. 9A and 9B illustrate a focus detecting optical system corresponding to the ten focus detection areas in the photographing image field shown in FIG. 8.
Figure 9B:
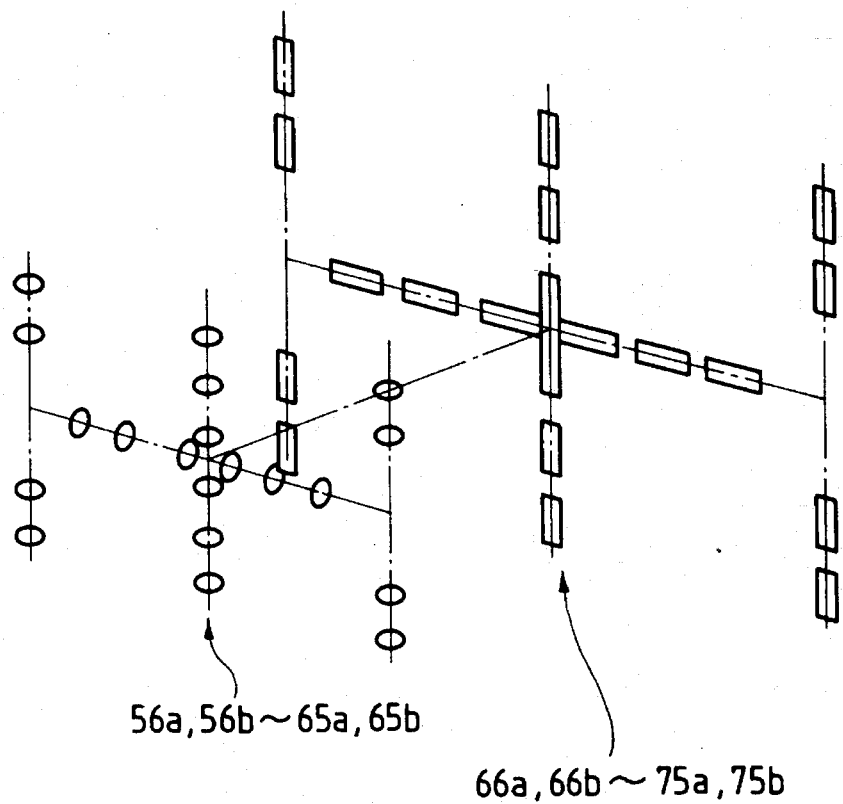

Also, the focus detecting optical system shown in FIGS. 9A and 9B, corresponding to the ten focus detection areas 46–55 in the photographing image field 45 shown in FIG. 8, is provided with ten field lenses, not shown, near the predetermined imaging plane of the photo-taking lens 1, ten pairs of re-imaging lenses 56a, 56b–65a, 65b rearwardly thereof, and ten pairs of photoelectric element arrays 66a, 66b–75a, 75b.

Figure 10:
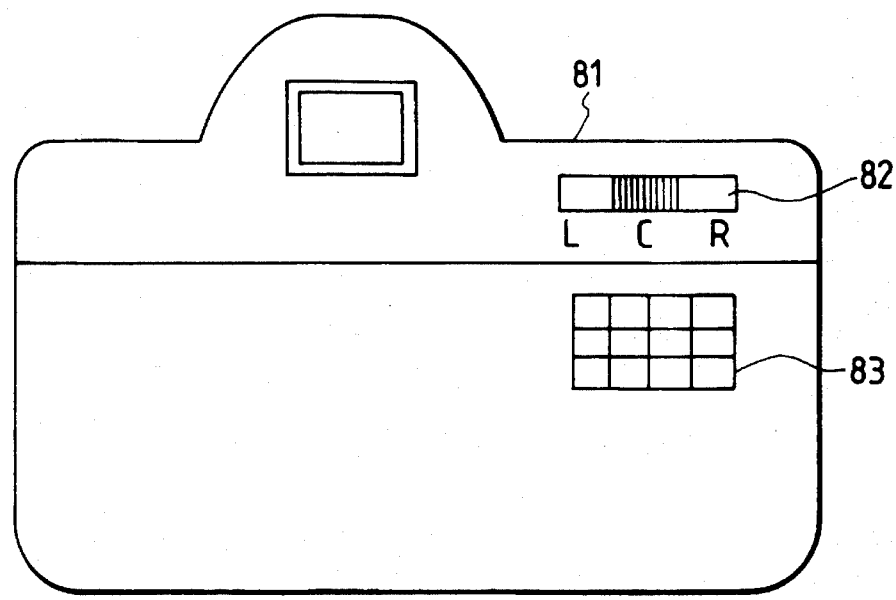
FIG. 10 illustrates setting members for setting the position of a selection area in the photographing image field.

FIG. 10 illustrates setting members for setting the position of the selection area in the photographing image field. The setting member is provided, for example, at a location on the back of a camera 81 which is easy to set by the thumb of the right hand. The setting member 82 is shown as an example using a slide switch, and sets the position of the selection area in one of the three left, central and right areas of the photographing image field. The setting member 83 is shown as an example using a touch sensor, and sets the position of the selection area in one of the areas of the photographing image field divided into twelve areas.

FIG. 6B shows an example of the setting of the selection area and the non-selection area. In the photographing image field 21 wherein five focus detection areas 22–26 are set, the position of the selection area is set to the left side of the photographing image field 21 by the setting member 82 or 83, and the selection area 85 including two focus detection areas 22 and 23 and the non-selection area 86 including the focus detection areas 24–26 are set by the area setting portion 7.

The setting members for setting the position of the selection area are not restricted to the above-mentioned slide switch and touch sensor.

A description will now be given of a setting portion by which the camera automatically judges and determines the position of the selection area in accordance with a predetermined algorithm.

Figure 11:
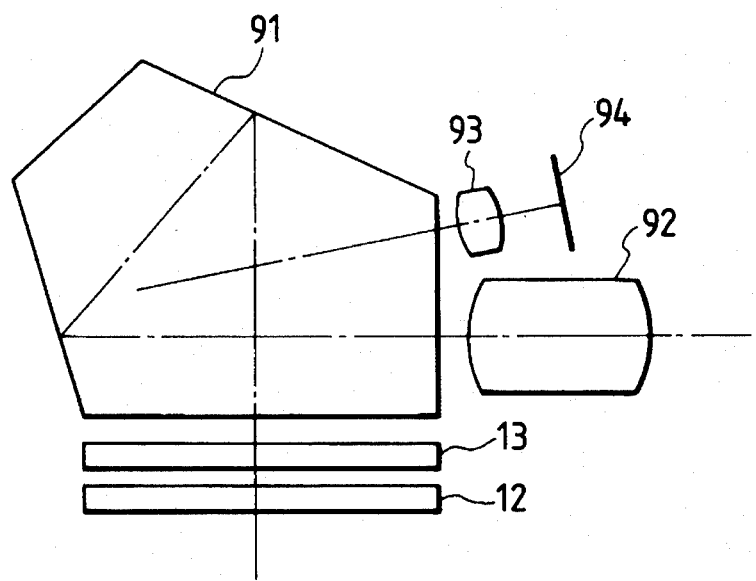
FIG. 11 illustrates the finder portion of a camera.
Figure 12:
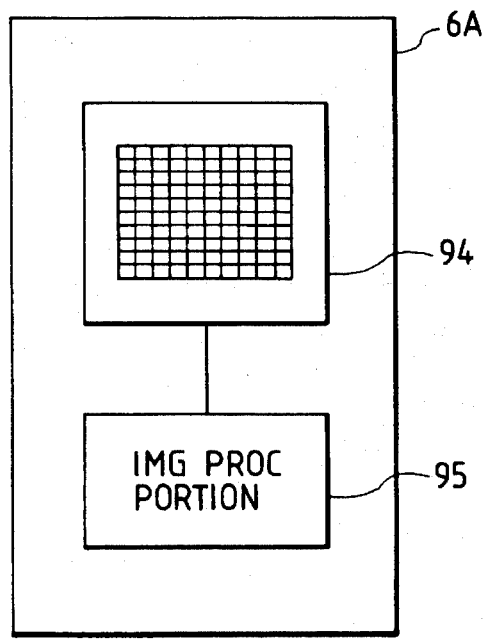
FIG. 12 illustrates a setting portion for setting a selection area on the basis of the result of the image processing by an image sensor.

FIG. 11 illustrates the finder portion of the camera shown in FIG. 5. A part of the light beam from the object passing through the photo-taking lens 1 and reflected by the main mirror 2 passes through the screen mat 12 and the indicating portion 13 and is directed to a pentagonal prism 91. Further, a part of the light beam is directed to the photographer's eye by the pentagonal prism 91 via an eyepiece 92, and the other part of the light beam is directed to a two-dimensional image sensor 94 via a lens 93 and an object image is formed on the two-dimensional image sensor 94. The two-dimensional image sensor 94 effects photoelectric conversion in conformity with the light intensity distribution of this object image and outputs an image signal to the image processing portion 95 of the setting portion 6A shown in FIG. 12. The two-dimensional image sensor 94 need not be exclusively for use for focus detection.

The image processing portion 95 compares a part of the last image signal corresponding to that focus detection area in the selection area which is most related to the result of the focus detection with a part of the current image signal. On the basis of the image signal of the two-dimensional image sensor 94 output at every several tens of ms, processing portion 95 finds the position which is greatest in correlation and calculates the direction and amount of movement of the main object.

Figure 13:
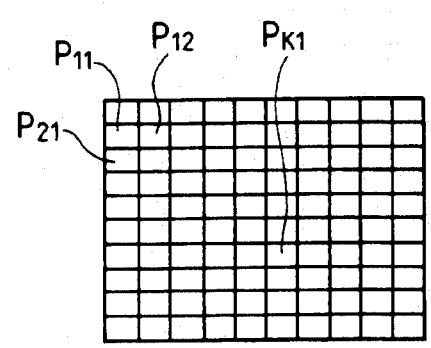
FIG. 13 illustrates a two-dimensional image sensor.
Figure 14:
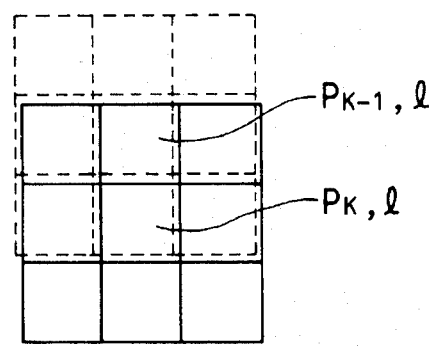
FIG. 14 illustrates an image processing method.

The calculating method will hereinafter be described in detail with reference to FIGS. 13 and 14. When the number of the picture elements of the two-dimensional image sensor 94 is 100 and as shown in FIG. 13, the picture elements from the left upper corner to the right lower corner are given numbers, for example, nine picture elements centering around a picture element Pkl (indicated by solid lines in FIG. 14), i.e., P(k–1, l–1), P(k–1, l), P(k–1, l+1), P(k, l–1), P(k, l), P(k, l+1), P(k+1, l–1), P(k+1, l), P(k+1, l+1), and nine picture elements centering around the picture element P(k–1, l) slightly deviated from the positions thereof (indicated by broken lines in FIG. 14), i.e., P(k–2, l–1), P(k–2, l), P(k–2, l+1), P(k–1, l–1), P(k–1, l) , P(k–1, l+1), P(k, l–1), P(k, l), P(k, l+1), are compared with one another and the sum S(i, j) of the absolute value of the output difference between image signals is found for each corresponding picture element.

$$S(i, j) = \Sigma\Sigma |P(k+m, l+n) - P(k+m+i, l+n+j)|, \quad (1)$$

where $\Sigma\Sigma$ shows the sum total of m=–1–+1, n=–1–+1. The value of (i, j) at which this sum S(i, j) is minimum indicates the direction and amount of movement of the main object.

The setting portion 6A determines the position of the selection area on the basis of the calculated position of the main object, or if the main object has moved, the direction and amount of that movement.

A description will now be given of a setting portion for detecting the portion of the photographing image field that the photographer's eye is gazing onto when looking into the finder of the camera, and then determining that position as the position of the selection area.

Figure 15:
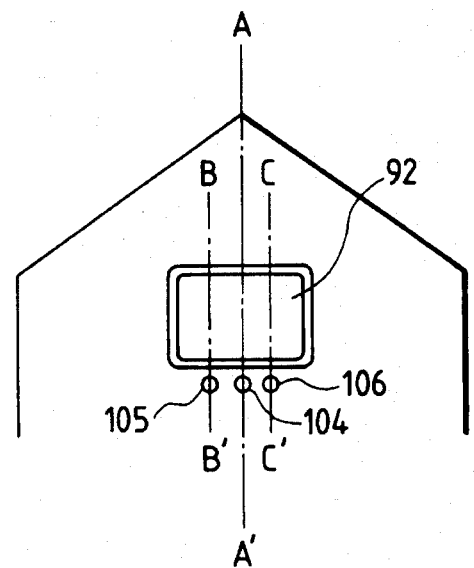
FIG. 15 is rear view of the finder portion of the camera.
Figure 16:
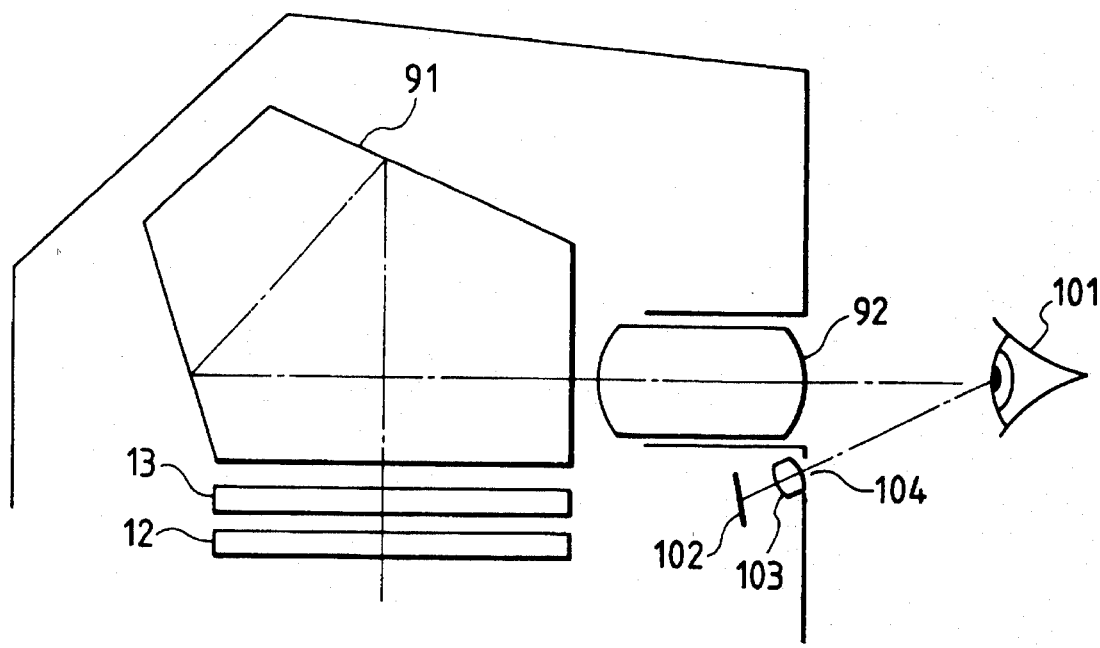
FIG. 16 is a cross-sectional view of the finder portion of the camera.
Figure 17:
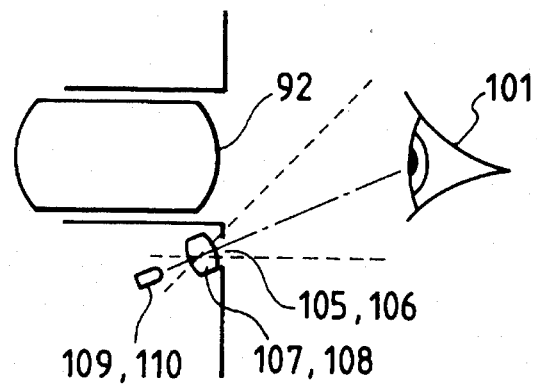
FIG. 17 is a cross-sectional view of the finder portion of the camera.

FIG. 15 is a view of the finder portion of the camera as it is seen from the rear thereof. FIG. 16 is a cross-sectional view of the finder portion of FIG. 15 taken along the line A—A' of FIG. 15. FIG. 17 is a cross-sectional view of the finder portion taken along the line B—B' or C—C' of FIG. 15.

As described above, a part of the light beam from the object arrives at the photographer's eye 101 via the pentagonal prism 91 and the eyepiece 92. An image sensor 102 is provided under the eyepiece 92, and the image of the photographer's eye 101 obtained by a lens 103 through an opening 104 is formed on the image sensor 102. Openings 105 and 106 are formed at the left and right of the opening 104, and as shown in FIG. 17, lenses 109, 108 and infrared LEDs 109, 110 are provided in the openings 105 and 106, respectively. Illuminating light beams emitted from these infrared LEDs 109 and 110 are directed to the photographer's eye 101 through the respective lenses 107, 108 and openings 105, 106, and the light beams reflected by the photographer's eye 101 are directed to the image sensor 102 through the opening 104 and the lens 103.

Figure 18:
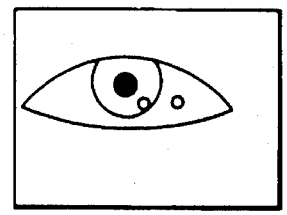
FIG. 18 illustrates the images of a photographer's eye and openings for illumination projected onto the image sensor.
Figure 19:
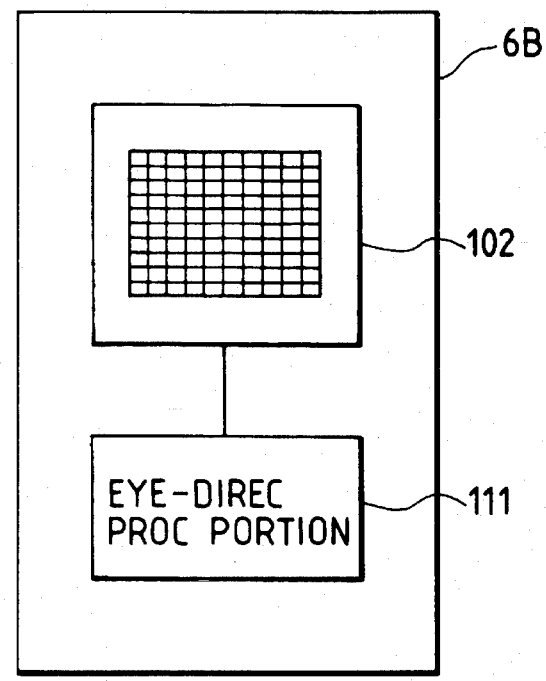
FIG. 19 illustrates a setting portion for detecting the position of a photographer's eye-direction and setting a selection area.

FIG. 18 illustrates the image of the photographers's eye 101 and the images of the openings 105 and 106 for illumination in the infrared LEDs 109 and 110 projected onto the image sensor 102. FIG. 19 shows a setting portion 6B for determining the position of the selection area by the position of the photographer's eye direction.

Figure 20:
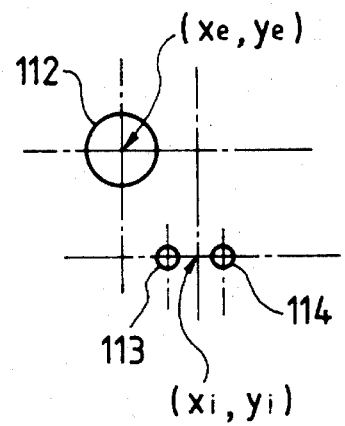
FIG. 20 illustrates the positional relation between the pupil of the photographer's eye and the openings for illumination.

The image sensor 102 produces an electrical signal, i.e., an image signal, in conformity with the light intensity distributions of the projected images of the photographer's eye 101 and the openings 105 and 106 for illumination and outputs it to an eye-direction processing portion 111. The eye-direction processing portion 111 processes the image signal obtained from the image sensor 102, and extracts the image 112 of the pupil and the images 113 and 114 of the openings for illumination as shown in FIG. 20. Further, it finds the coordinates (xe, ye) of the central position of the image 112 of the pupil and the coordinates (xi, yi) of the central position of the images 113 and 114 of the two openings for illumination.

At which portion in the photographing image field the photographer's eye is gazing is judged on the basis of these coordinates (xe, ye) and (xi, yi). This judgment is done with reference to the memory table of the position of the photographer's eye direction experimentally found for the positional relations between the coordinates (xe, ye) of the pupil and the coordinates (xi, yi) of the openings for illumination. The position of the photographer's eye direction may be detected by the use of an approximate expression representative of those relations.

The above-described method of detecting the position of the eye direction has the following features. The light for the light emitting and receiving portions for the detection of the eye direction does not pass through the eyepiece 92 of the finder and therefore, the light from the object incident from the photo-taking lens 1, i.e., unnecessary stray light, does not mix. Thus, and the eye direction can be detected accurately without the problem of ghost imaging. Further, an optical system for separating the light beam from the object and the light beam for detecting the position of the eye direction from each other around the eyepiece 92 becomes unnecessary and therefore, the structure becomes simple and compact.

If the light emitting and receiving portions for the detection of the eye direction are installed above the eyepiece 92, the illuminating light and reflected light will be intercepted by the upper eyelid of the photographer's eye 101 and detection will become difficult and therefore, they are installed below the eyepiece 92.

Also, usually, the positional relation between the photographer's eye 101 looking into the finder and the opening 104 for imaging varies in the range of 10–30 mm. Accordingly, it is necessary to heighten the magnification of the lens 103 and deepen the depth of field. For example, the magnification of the lens 103 is set to 1/10–1/20 time. Thus, the distance from the lens 103 to the image sensor 102 becomes 2 mm or less, and the light receiving surface of the image sensor becomes 2 mm square or less. That is, according to the above-described method of detecting the position of the eye direction, the eye-direction detecting optical system can be compactly constructed.

The position of the focus detection area which is most related (great in the degree of contribution) to the result of the focus detection using the plurality of focus detection areas included in the selection area, i.e., the focus detection area which has provided the basis for calculating the direction and amount of driving of the photo-taking lens 1, may basically or chiefly be set as the next position of the selection area.

A description will now be given of a method of setting the selection area by the area setting portion 7. The area setting portion 7, as described above, sets a selection area including a plurality of focus detection areas and a non-selection area including at least one focus detection area in the photographing image field on the basis of the position of the selection area determined by the setting portion 6. This setting work is done in each focus detection cycle which will be described later, and when the position of the selection area is changed by the setting portion 6 or when the object is moving, the selection area moves in the photographing image field.

There are several combinations of methods of setting the selection area in such a manner as to include a plurality of focus detection areas from among three or more focus detection areas set in the photographing image field, but the selection area is set so that in adjacent selection areas, one or more common focus detection areas included in both selection areas may exist without fail.

Figure 21A:
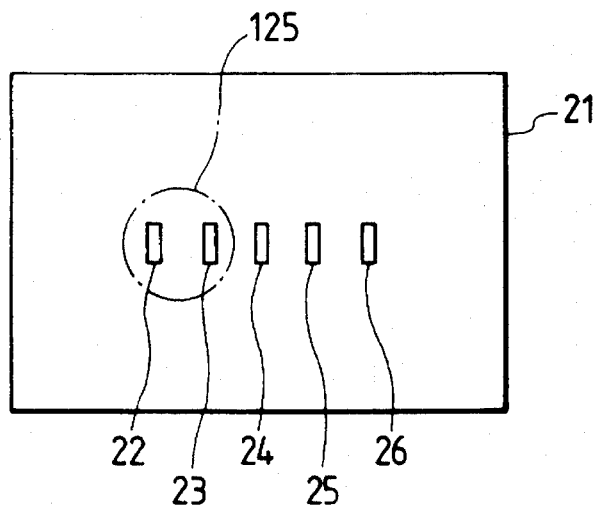
FIGS. 21A to 21C illustrate the relations between adjacent selection areas and focus detection areas. included in the selection areas.
Figure 21B:
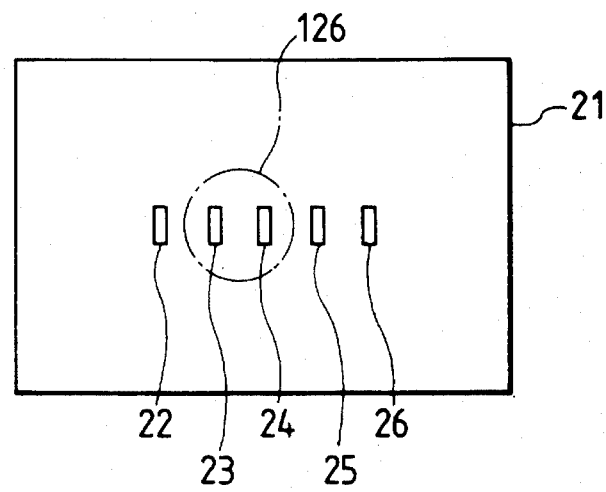
Figure 21C:
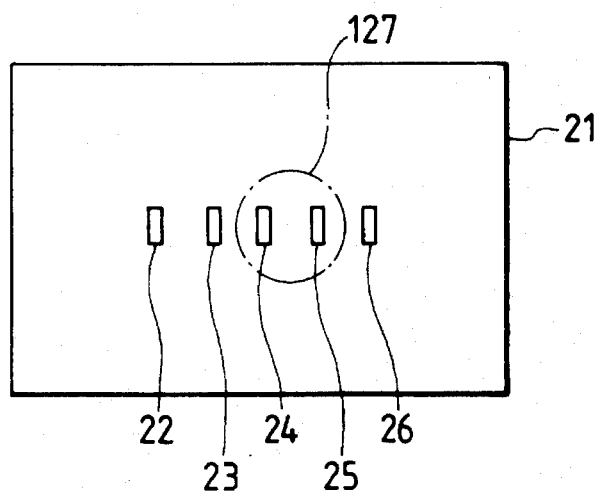
Figure 22A:
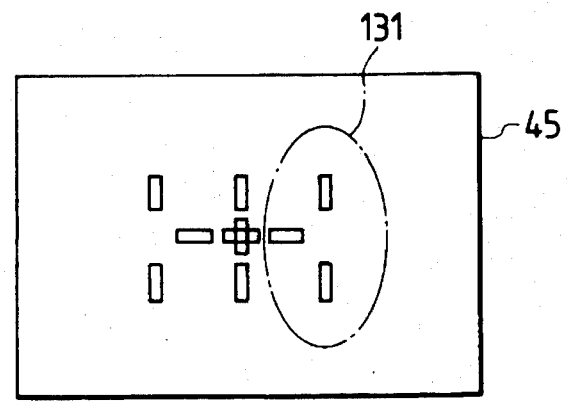
FIGS. 22A to 22D illustrate the relations between adjacent selection areas and focus detection areas included in the selection areas.
Figure 22B:
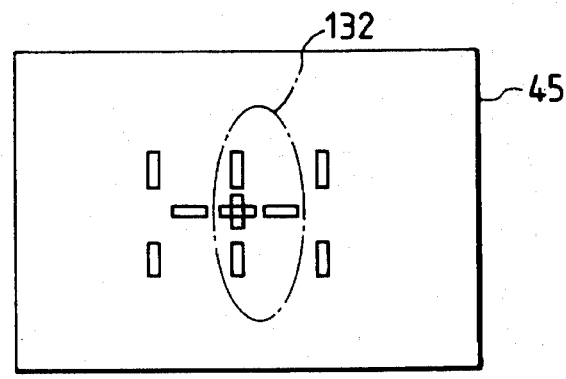
Figure 22C:
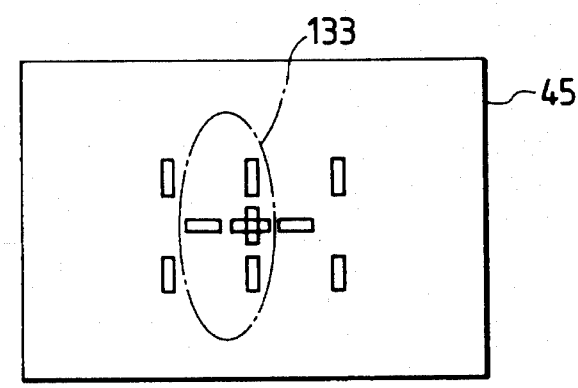
Figure 22D:
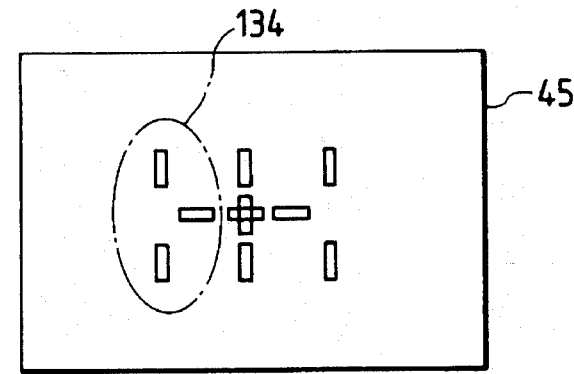
Figure 23A:
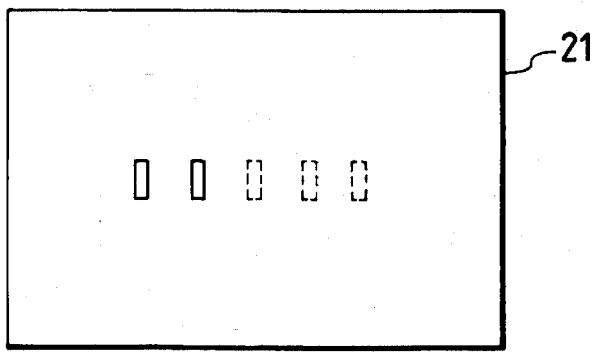
FIGS. 23A to 23C are illustrative examples of the indication of the selection area and focus detection areas.
Figure 23B:
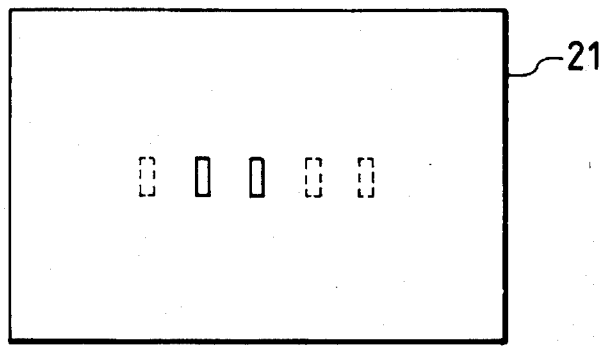
Figure 23C:
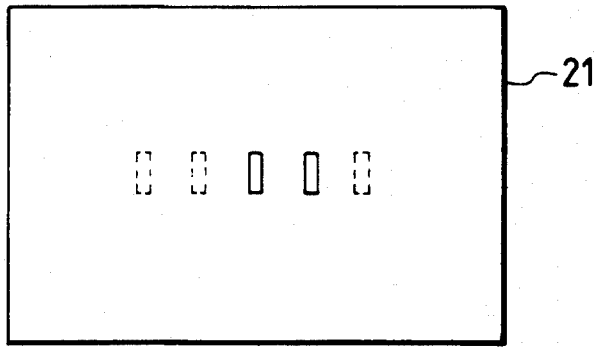
Figure 24A:
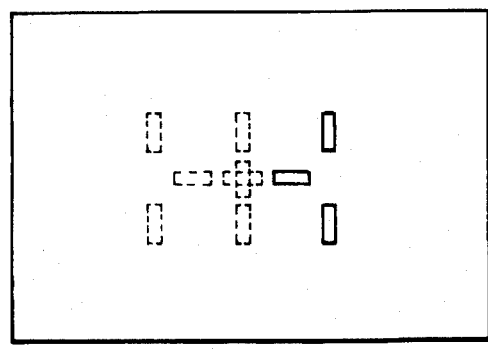
FIGS. 24A to 24D are illustrative examples of the indication of the selection area and focus detection areas.
Figure 24B:
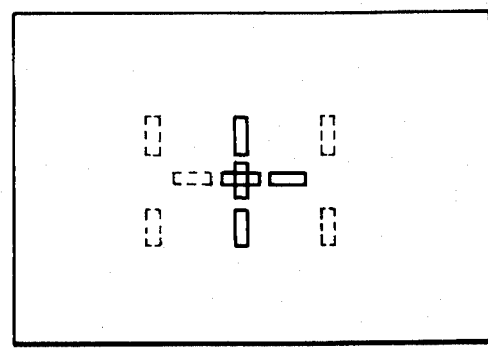
Figure 24C:
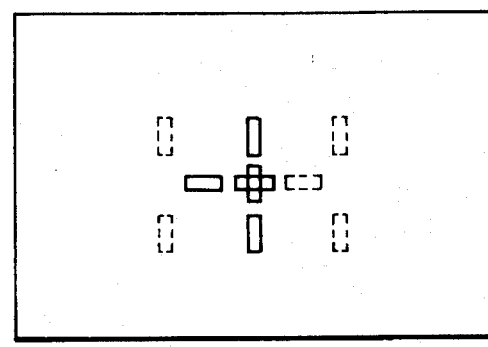
Figure 24D:
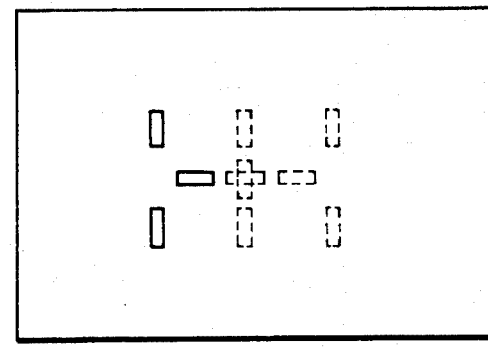

As shown, for example, in FIGS. 21A to 21C, in the photographing image field 21 in which five focus detection areas 22–26 are set, the selection area 125 shown in FIG. 21A and the selection area 126 shown in FIG. 21B are adjacent to each other, and the focus detection area 23 is included in both selection areas 125 and 126. Also, the selection area 126 shown in FIG. 21B and the selection area 127 shown in FIG. 21C are adjacent to each other, and the focus detection area 24 is included in both selection areas 126 and 127.

Likewise, as shown in FIGS. 22A to 22D, in the photographing image field 45 in which ten focus detection areas are set, at least one common focus detection area included in both selection areas exists in the selection areas 131–134 adjacent to one another.

By thus setting the selection areas, a moving object can be pursued to thereby move the selection area smoothly, and the follow-up property of the selection area can be improved.

Also, as shown, for example, in FIGS. 22A to 22D, the directions in which the image shift of a plurality of focus detection areas included in each of the selection areas 131–134 is detected are not all the same. In the examples shown in FIGS. 22A to 22D, the directions of detection of the image shift of the focus detection areas in each selection area are orthogonal to each other, and for any vertically or horizontally elongate object, focus detection becomes possible in either focus detection area.

By thus setting the selection areas so as to include therein a plurality of focus detection areas in which the directions of detection of the image shift are not parallel to each other, focus detection can be reliably accomplished for an object of only vertical stripes or of only horizontal stripes in any selection area.

FIGS. 23A–26D show examples of the indication by the indicating portion 13. The indicating portion 13 is constructed of liquid crystal, an electrochromic element or the like, and indicates the selection area and the focus detection areas over the object image on the finder screen.

In FIGS. 23A to 23D, of the five focus detection areas 22–26 shown in FIG. 6A, the focus detection areas included in the selection area are clearly indicated (in the figures, indicated by solid lines), and the focus detection areas included in the non-selection area are lightly indicated (in the figures, indicated by broken lines). Likewise, in FIGS. 24A to 24D, of the ten focus detection areas 46–55 shown in FIG. 8, the focus detection areas included in the selection area are clearly indicated (in the figures, indicated by solid lines), and the focus detection areas included in the non-selection area are lightly indicated (in the figures, indicated by broken lines). Alternatively, only the focus detection areas included in the selection area may be indicated.

Figure 25A:
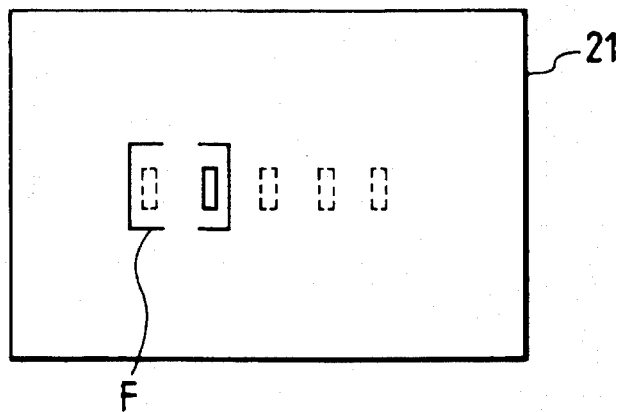
FIGS. 25A to 25C are illustrative examples of the indication of the selection area and focus detection areas.
Figure 25B:
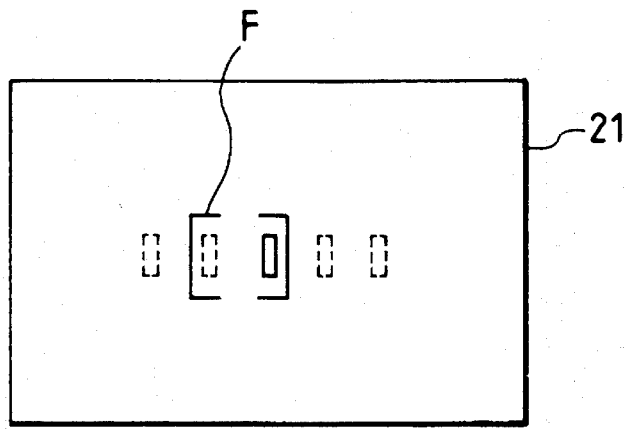
Figure 25C:
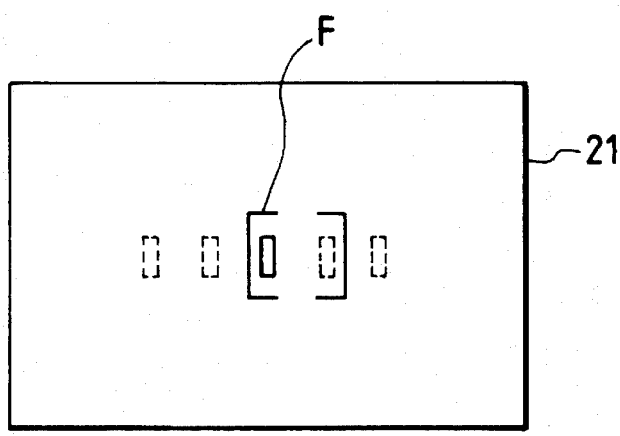
Figure 26A:
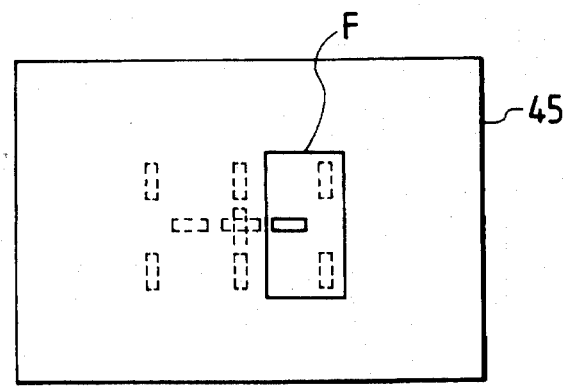
FIGS. 26A to 26D are illustrative examples of the indication of the selection area and focus detection areas.
Figure 26B:
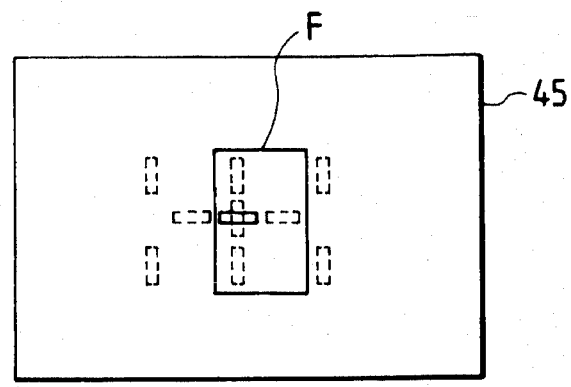
Figure 26C:
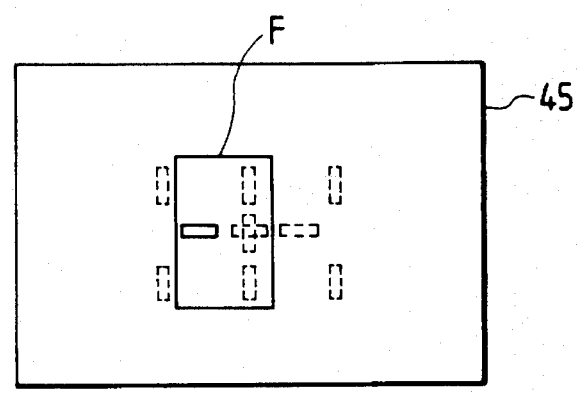
Figure 26D:
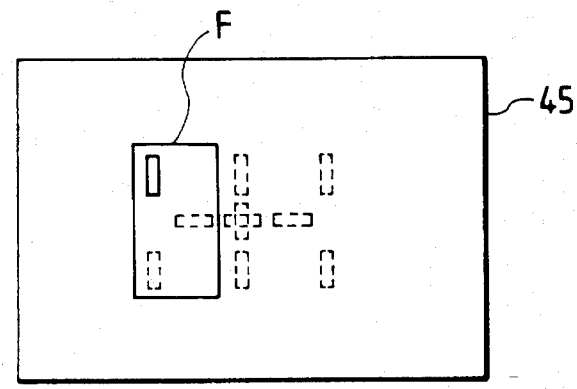

Also, in FIGS. 25A to 25C, of the five focus detection areas 22–26 shown in FIG. 6A, the selection areas are indicated while being encircled by a frame F and further, the focus detection area therein which has provided the basis for calculating the direction and amount of driving of the photo-taking lens 1 is clearly indicated (in the figures, indicated by solid line), and the other focus detection areas are lightly indicated (in the figures, indicated by broken lines). Likewise, in FIGS. 26A to 26D, the selection area is indicated while being encircled by a frame F, and the focus detection area in the frame which has provided the basis for calculating the direction and amount of driving of the photo-taking lens 1 is clearly indicated (in the figures, indicated by solid line), and the other focus detection areas are lightly indicated (in the figures, indicated by broken lines). The selection area may be clearly indicated and all the focus detection areas may be lightly indicated, or only the selection area may be indicated.

Figure 27:
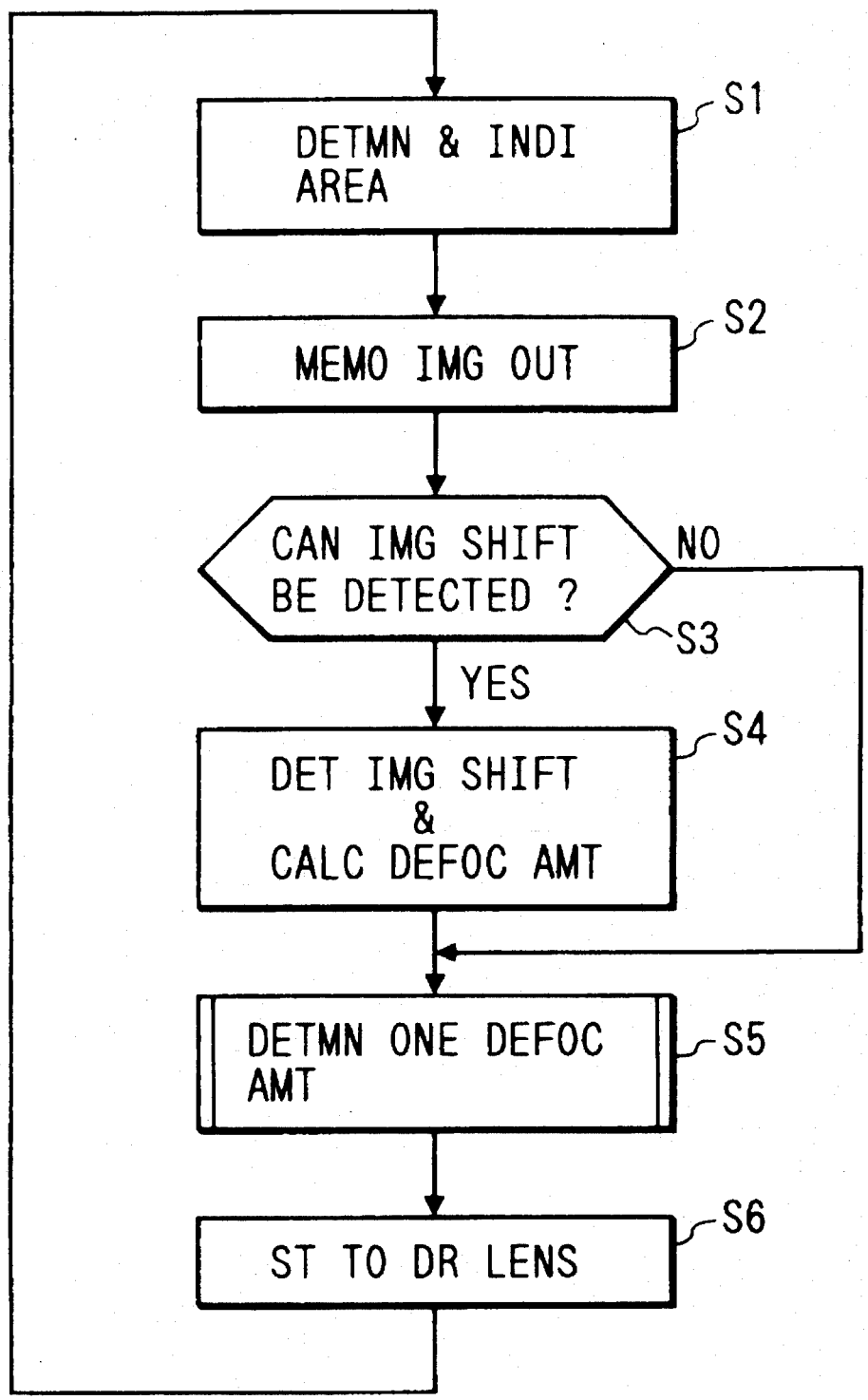
FIG. 27 is a flow chart illustrating the operation of the first embodiment.

The operation of the first embodiment will now be described with reference to FIG. 27.

First, at a step S1, the selection area is determined and indicated. As described above, the selection area is set by the area setting portion 7 in conformity with the position of the selection area manually or automatically set by the setting portion 5, and is indicated by the indicating portion 13 shown in FIG. 5. Particularly, it is reliable to manually effect the first setting of the selection area during the switching-on of the power source or during resetting. At the next step S2, the electrical signals, i.e., the image signals, output from the pair of photoelectric element arrays 5 corresponding to the focus detection areas in the selection area are memorized in a memory. At a step S3, whether the amount of image shift can be detected on the basis of the pair of image signals memorized in the memory is discriminated, and for example, when the detection of the amount of image shift is impossible as for an object having no contrast, a step S4 is skipped. At the step S4, the amount of image shift of each focus detection area is calculated on the basis of the pair of image signals memorized in the memory.

At a step S5, one of the defocus amounts of the plurality of focus detection areas in the selection area is determined. Of course, when there are a plurality of focus detection areas which provide defocus amounts of substantially the same values, some statistical processing may be carried out. As a method of determining one of the defocus amounts of the plurality of focus detection areas in the selection area, there would occur to mind, for example, a close priority method of selecting the value of the area indicative of the object position closest to the camera, a present condition priority method of selecting the value of the area indicative of a value most approximate to the result of the focus detection of the area selected the last time, a method of selecting the value of the focus detection area in which the above-described photographer's eye particularly concentrates, or a method of selecting a focus detection area with the movement of the main object in the image field which results from the above-described image processing taken into account, and selecting the value thereof. The direction and amount of driving of the photo-taking lens 1 are calculated on the basis of the defocus amount determined by any one of these methods or a method to which these methods are added, and at the next step S6, the photo-taking lens 1 is moved by the lens driving portion 9.

As described above, the design is such that three or more focus detection areas are set in the photographing image field and a selection area including a plurality of focus detection areas is set at a location whereat the intended object exists and also a non-selection area including at least one focus detection area is set. The outputs of the photoelectric element arrays corresponding to the selection area and non-selection area are subjected to different processings, and focus detection is effected on the basis of the result of the processing of the output of the photoelectric element array belonging to the selection area. By doing so, focus detection becomes possible in a wide range in the photographing image field, and the intended object can be reliably caught in any one of the focus detection areas and moreover, even if the number of the focus detection areas is great, focus detection calculation is effected in only the focus detection areas included in the selection area near the intended object and therefore, the focus detection time is shortened.

In this case, the individual focus detection areas are set to such a size that the probability with which a deep object image lies in a focus detection area is small (the order of 0.5 mm to 3 mm on the finder screen). Also, if a narrow focus detection area is simply used, the possibility of the main object coming off said focus detection area due to slight camera shake or the slight movement of the object is great and therefore, a selection area including one or more focus detection areas lying closely adjacent to said focus detection area is set so that the main object may not be missed even for slight camera shake. However, if the selection area is made too wide, the probability with which an unintended object is selected by mistake will increase and the calculation time will also increase, and this is not preferable. In this sense, it is preferable that the expanse of the selection area be of the order of 3 to 10 mm on the finder screen.

Also, the design is such that the photographer manually sets the position of the selection area to any position and therefore, the selection area can be set to the intended object at the timing the photographer considers to be necessary. Further, the design is made such that on the basis of a change in the position of the main object detected by the image signal of the image sensor being processed, or the main object obtained by the photographer's eye direction being detected and a change therein, the next position of the selection area in the focus detection cycle repeated at a cycle of several hundred ms or less is automatically set and therefore, even when the main object moves in the finder screen, the main object is pursued and the selection area is selected without the selection area being constantly manually changed over, and thus, operability is improved.

The photographer, at the first cycle or when he wants to change the main object on the basis of his intention, simply indicates (as required) to the camera at which position the main object lies, by a manual operation (in some cases, by an eye-direction operation), and thereafter the camera automatically judges the main object and determines the selection area to thereby pursue the main object and thus, the usability of the camera is improved.

Second Embodiment

In the above-described first embodiment, no processing is effected to the focus detection area belonging to the non-selection area, whereas the selection area in the photographing image field is not always fixed, but may move with time. Also, the charge accumulation type photoelectric element array 5 need have its charge accumulation time adjusted in conformity with the light intensity of the object to obtain a predetermined image output level. Usually, the next optimum charge accumulation time is calculated on the basis of the current image output and charge accumulation time, and during the next photoelectric conversion, the accumulation of charges is effected for that time.

Now, the selection area moves in the photographing image field with the movement of the main object and therefore, the next charge accumulation time is not yet calculated in the focus detection areas newly included in the selection area. Accordingly, proper accumulation control cannot be effected to the focus detection areas newly included in the selection area and as a result, focus detection for those focus detection areas becomes impossible.

In order to avoid such an incovenience, in this second embodiment, even the focus detection area belonging to the non-selection area is set in the selection area next time, or for a focus detection area having high such possibility, the next optimum charge accumulation time is calculated on the basis of the current image output and charge accumulation time.

Figure 28:
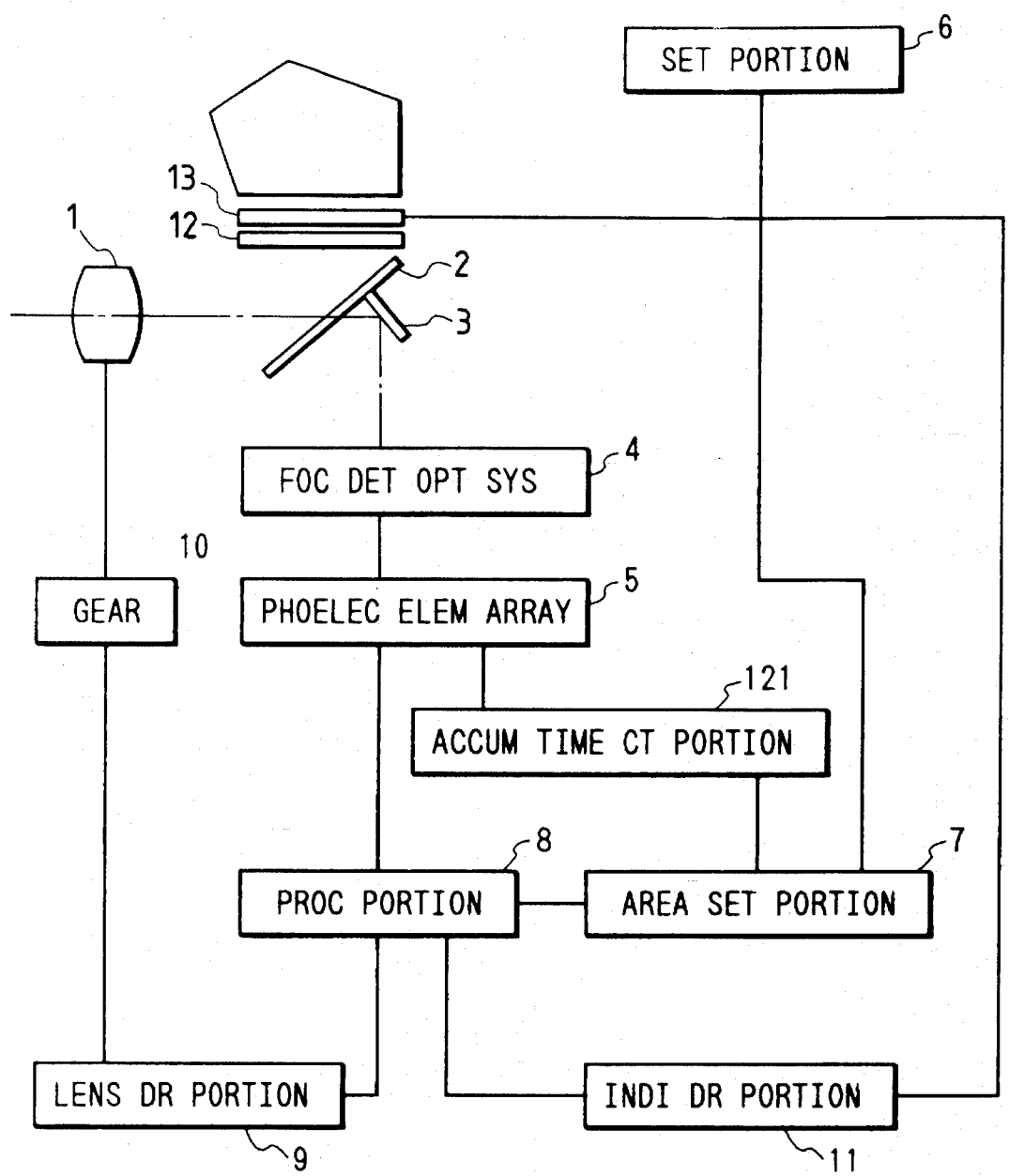
FIG. 28 is a block diagram illustrating the construction of a second embodiment of the present invention.

FIG. 28 is a block diagram showing the construction of the second embodiment. This second embodiment is provided with an accumulation time calculating portion 121 for calculating the next charge accumulation time on the basis of the current image output and charge accumulation time of the photoelectric element array 5. Except for this accumulation time calculating portion 121, the construction of the second embodiment is similar to the construction of the first embodiment shown in FIG. 5, and in FIG. 28, portions similar to those in FIG. 5 are given similar reference numerals and need not be described.

Figure 29:
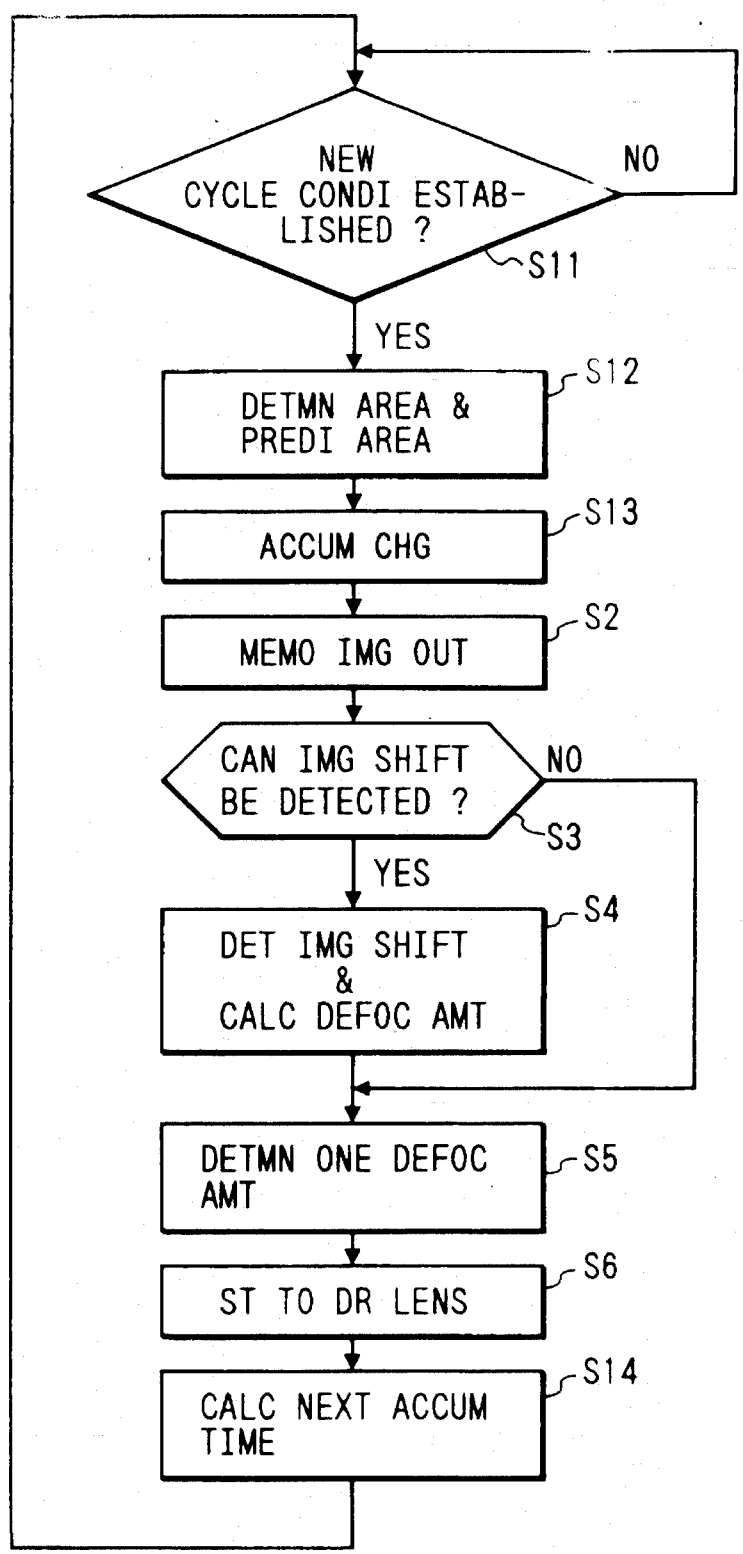
FIG. 29 is a flow chart illustrating the operation of the second embodiment.

FIG. 29 is a flow chart showing the operation of the second embodiment. Steps for carrying out processes similar to those in FIG. 27 showing the operation of the first embodiment are given similar step numbers and description will hereinafter be made chiefly of the differences.

At a step S11, the starting conditions of a new focus detection cycle are confirmed, and if the conditions are satisfied, the focus detecting operation is started. The cycle starting conditions include the completion of the transfer of the accumulated charges in the photoelectric element array 5, the completion of focus detection calculation, the completion of the driving of the photo-taking lens 1, etc. At the next step S12, the selection area is determined by the above-described procedure and also the next selection-predicted area is determined. This next selection-predicted area is a part or the whole of the non-selection area selected on the basis of the direction and distance of movement of the above-described moving object.

Subsequently, at a step S13, charge accumulation in the photoelectric element array 5 corresponding to the focus detection areas included in the selection area and the next selection-predicted area is effected, whereafter at steps S2–S6, the above-described processing is carried out, and advance is made to a step S14. At the step S14, on the basis of the magnitude of the image output and the charge accumulation time of the photoelectric element array 5 corresponding to the focus detection areas in the selection area and the next selection-predicted area, the next charge accumulation time for each of those areas is calculated.

At the step S2, the image output itself in the selection-predicted area or at least a representative value such as a maximum value, a minimum value or a mean value is memorized, and is used for the next accumulation time calculation at the step S14. Or the step S14 may be executed immediately after the step S2 and only the next accumulation time may be memorized, and in such case, the image output regarding the selection area can be erased after the step S14 and thus, the memory can be saved.

As described above, the design is such that even for the focus detection area included in the non-selection area, but expected to be included in the selection area next time on the basis of the direction and distance of movement of the moving object, the next charge accumulation time is calculated on the basis of the current output and charge accumulation time of the photoelectric element array for that area and therefore, even if a new focus detection area is included in the selection area with the movement of the object, focus detection can be effected within a short time and the responsiveness of focus detection to the moving object is improved.

Third Embodiment

Usually, the selection area is set to such a size that the object does not simply come off the selection area due to camera shake or the like. Where photographing is effected with a stationary object caught in the selection area, the size of the selection area may be small, but where photographing is effected with a moving object pursued, it is easier to catch the moving object if the selection area is wide. A description will now be given of a third embodiment in which like this, the size of the selection area is changed in conformity with photographing conditions.

Figure 30:
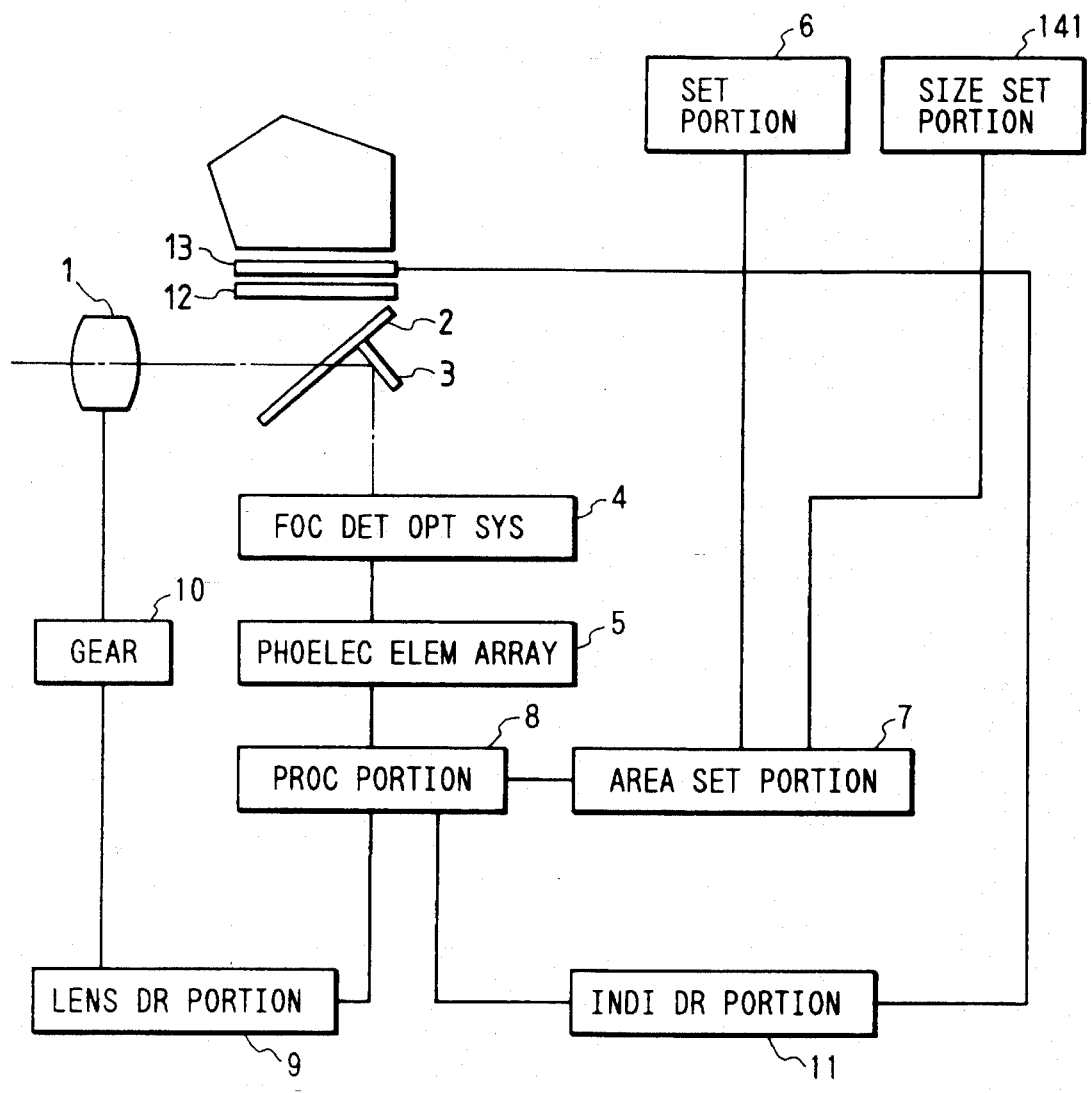
FIG. 30 is a block diagram illustrating the construction of a third embodiment of the present invention.

FIG. 30 shows the construction of the third embodiment. In this embodiment, a size setting portion 141 is added to the first embodiment shown in FIG. 5, and portions similar to those in the first embodiment are given similar reference numerals and need not be described.

Figure 31:
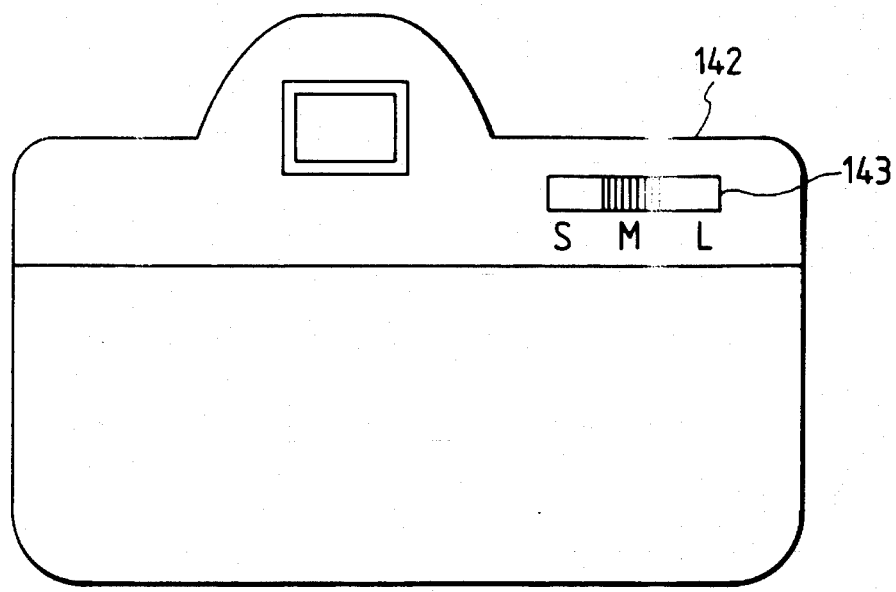
FIG. 31 illustrates a size setting member provided on the back of the camera.

The size setting portion 141, as shown in FIG. 31, sets the size of the selection area by a size setting member 143 provided on the back of a camera 142. The size setting member 143 is comprised of a slide type switch and can select any size of the selection area from among three small, medium and large sizes. The "medium" size is such a size that the object does not simply come off the selection area due to camera shake or the like. The "small" size is narrower than that and is effective when focus adjustment is to be strictly effected for a stationary object, and the "large" size is effective when photographing is to be effected with a moving object pursued most widely.

The design may be made such that the number of focus detection areas included in the selection area is determined in conformity with the size set by the size setting member 143. For example, the design may be such that two focus detection areas are included in the selection area of the "small" size, that three focus detection areas are included in the selection area of the "medium" size, and that four or more focus detection areas are included in the selection area of the "large" size.

The size setting member 143 is not restricted to a slide type switch, but may be comprised of a dial type switch, a touch sensor or the like.

In the above-described third embodiment, the design is such that the size of the selection area is set by the size setting portion 141 in conformity with the size set by the size setting member 143, but alternatively, the design may be such that the stillness or movement of the object is detected on the basis of the result of the image processing by the above-described two-dimensional image sensor 102 or the stillness or movement of the object is detected on the basis of the results Of two first and last focus detections and the interval between the two focus detections, whereby the camera automatically sets the size of the selection area. That is, for a stationary object, the size of the selection area is set to a usual size or narrower than that, and for a moving object, a wide selection area is set.

Also, the size of the selection area may be set on the basis of the result of the detection of the above-described eye-direction position. That is, if the photographer's eye-direction position is moving in a wide range in the photographing image field, a wide selection area is set, and if the photographer's eye-direction position is moving in a narrow range in the photographing image field, a narrow selection area is set.

Further, the size of the selection area may be set in conformity with the focal length of the photo-taking lens 1. That is, if the focal length of the photo-taking lens 1 is on the telephoto side, a wide selection area is set, and if the focal length of the photo-taking lens 1 is on the wide angle side, a narrow selection area is set.

Furthermore, provision may be made of a setting member for setting the time permitted for focus detection, and such a size of the selection area that focus detection is completed within the time set by that setting member may be set. That is, when the quick responsiveness of focus detection is necessary, a narrow selection area is set, and when the responsiveness of focus detection may be slow, a wide selection area is set.

As described above, the design is such that the size of the selection area is arbitrarily set by the photographer by the use of the size setting member or is automatically set in conformity with the photographing condition such as the stillness or movement of the object and therefore, whatever object can be reliably caught in the selection area, to thereby effect focus detection.

Fourth Embodiment

A description will now be given of an embodiment in which the present invention is applied to a camera provided with a predictive driving function for pursuing a moving object and driving a photo-taking lens.

Figure 32:
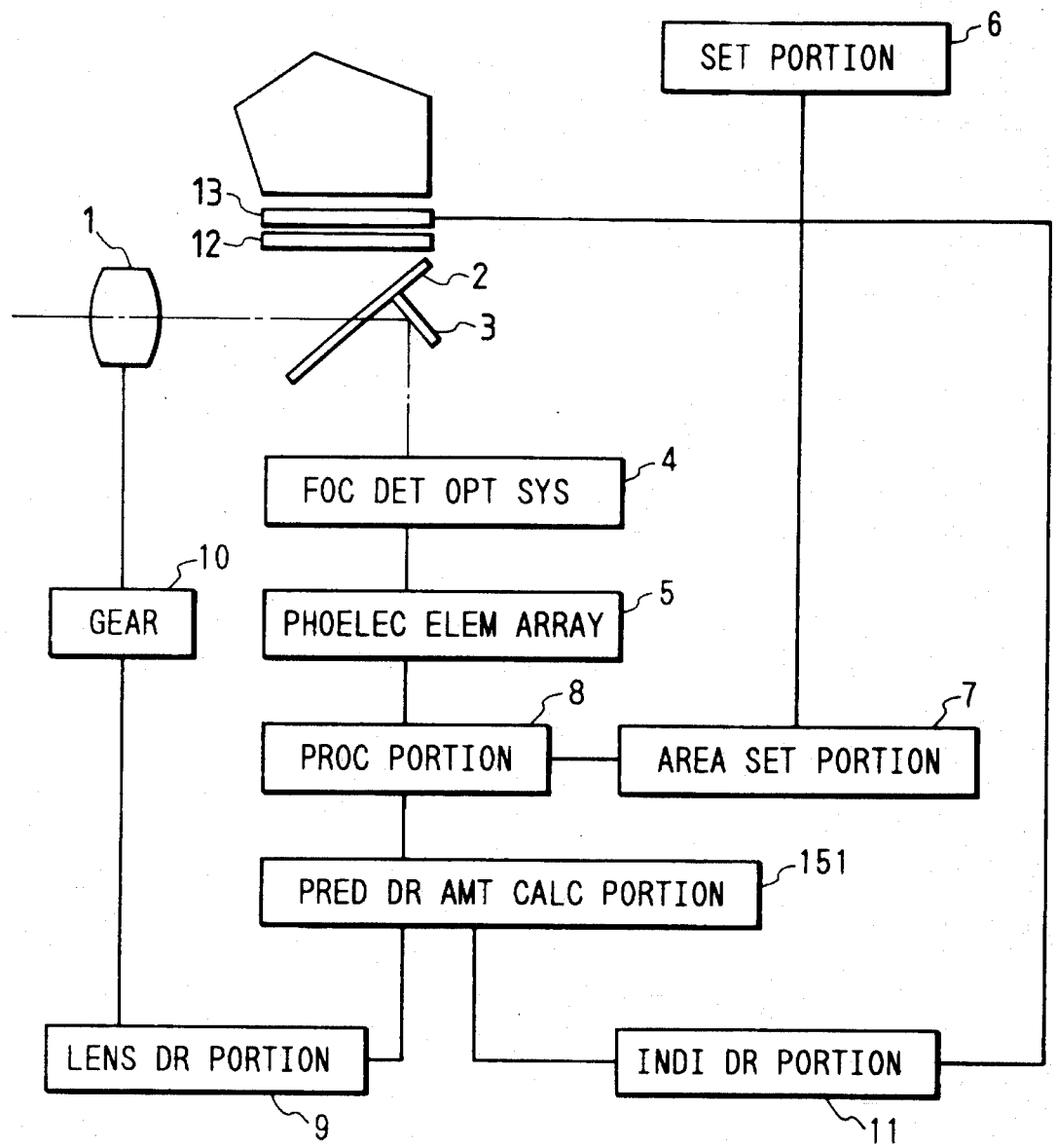
FIG. 32 is a block diagram illustrating the construction of a fourth embodiment of the present invention.

FIG. 32 shows the construction of a fourth embodiment. In this fourth embodiment, provision is made of a predicted driving amount calculating portion 151 for detecting the movement speed of a moving object and calculating the amount of movement of the object during the release time lag period from the point of time of focus detection till the actual exposure, and calculating an amount of predicted driving for focusing the photo-taking lens 1 on the moving object during the exposure. Except for this predicted driving amount calculating portion 151, the construction of the fourth embodiment is similar to the construction of the first embodiment shown in FIG. 5, and portions similar to those in FIG. 5 are given similar reference numerals and need not be described.

Figure 33:
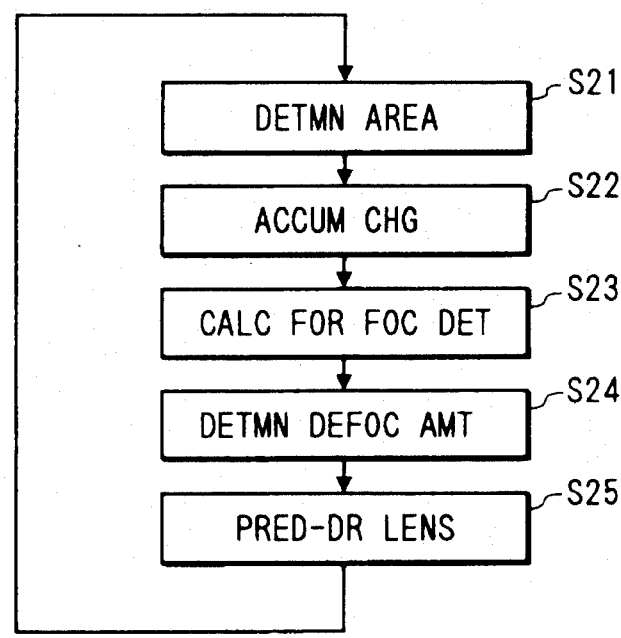
FIG. 33 is a flow chart illustrating the operation of the fourth embodiment.

The operation of the fourth embodiment will now be described with reference to a flow chart shown in FIG. 33.

First, at a step S21, the selection area is set by the above-described procedure, whereafter at a step S22, charge accumulation in the photoelectric element array 5 corresponding to the focus detection areas in the selection area is effected. Subsequently, at a step S23, focus detection calculation for each focus detection area is effected on the basis of the output signal of the photoelectric element array 5, and at the next step S24, one defocus amount is determined from the results of the plurality of focus detections by the above-mentioned close priority method, present condition priority method, method based on the result of the detection of the photographer's eye direction or method based on the result of image processing. Then, at a step S25, the stillness or movement of the object is judged on the basis of the current defocus amount, the last defocus amount and the amount of lens driving during the interval between the detections thereof, and if the object is judged to the moving, the future predicted position of the object or the lens speed for pursuit is calculated and the predicted driving of the photo-taking lens 1 is effected.

The above embodiment has been described with respect to a case where five and ten focus detection areas are set in the photographing image field, but the number of focus detection areas in the photographing image field is not limited to the above-described embodiment. The method of setting the selection area and the non-selection area is neither restricted to the above-described embodiment.

In the constructions of the above-described embodiments, the photoelectric element array 5 constitutes charge accumulation type photoelectric converting means, the processing portion 8 constitutes processing means and focus detecting means, the area setting portion 7 constitutes area setting means, the setting portions 6, 6A and 6B constitute position setting means, the setting members 82 and 83 constitute a position setting member, the image sensor 102, the lenses 103, 107, 108, the infrared LEDs 109, 110 and the openings 104–106 constitute eye-direction detecting means, the two-dimensional image sensor 94 constitutes two-dimensional photoelectric converting means, the image processing portion 95 constitutes analyzing means, the size setting portion 141 constitutes size setting means, the size setting member 143 constitutes a setting member, and the indicator driving portion 11 and the indicating portion 13 constitute indicating means.

As described above, according to the present invention, of three or more focus detection areas set in the photographing image field, a selection area including a plurality of focus detection areas and a non-selection area including at least one focus detection area are set, and a focus detecting process is carried out for the focus detection areas in the selection area and therefore, focus detection becomes possible in a wide range in the photographing image field and an intended object can be reliably caught in one of the focus detection areas and moreover, even if the number of focus detection areas is great, a focus detecting process is carried out for only the focus detection areas included in the selection area and thus, the focus detection time is shortened.

Also, for one of the focus detection areas included in the non-selection area which may be included in the selection area next time, the next charge accumulation time is calculated on the basis of the output value and charge accumulation time of the charge accumulation type photoelectric converting means therefor and therefore, even if a new focus detection area is included in the selection area with the movement of the object, focus detection can be effected within a short time and the responsiveness of focus detection to the moving object is improved.

Further, the position of the selection area is manually set to any position by the photographer and therefore, focus detection can be effected with the selection area set to the intended main object. Furthermore, the object position detected by processing the image signal of the image sensor or the eye-direction position obtained by detecting the photographer's eye direction is automatically set as the position of the selection area and therefore, it is unnecessary to manually re-select the position of the selection area frequently correspondingly to the movement of the object and operability is improved.

The size of the selection area and the number of focus detection areas included in the selection area is arbitrarily set by the photographer by the use of the setting member or is automatically set in conformity with the photographing condition such as the stillness or movement of the object and therefore, whatever object can be reliably caught in the selection area, to thereby effect focus detection.

What is claimed is:

1. A focus detecting apparatus comprising:

charge accumulation type photoelectric converting means provided correspondingly to at least three different focus detection areas set in a photographing image field and having a plurality of pairs of light receiving portions each for receiving a pair of light beams directed from a corresponding one of said focus detecting areas by a focus detecting optical system;

area setting means for setting, concurrently, a selection area and a non-selection area, said selection area including at least two of said focus detection areas and said non-selection area including at least one of said focus detection areas in said photographing image field;

processing means for applying processing to outputs of the charge accumulation type photoelectric converting means corresponding to said at least two focus detection areas included in said selection area, said processing being different from any processing applied to outputs of the charge accumulation type photoelectric converting means corresponding to any focus detection area included in said non-selection area; and focus detecting means for detecting the focus adjusted state of a photo-taking lens based on outputs of the charge accumulation type photoelectric converting means corresponding to said focus detection areas included in said selection area processed by said processing means, but not based on outputs of the charge accumulation type photoelectric converting means corresponding to any focus detection area included in said non-selection area.

2. A focus detecting apparatus according to claim 1, wherein said processing means memorizes at least the outputs of said charge accumulation type photoelectric converting means belonging to said selection area and also calculates the amount of image shift except when image shift calculation is impossible due to the deficiency or the like of the clear-cutness of the images on the pairs of light receiving portions of the charge accumulation type photoelectric converting means belonging to said selection area.

3. A focus detecting apparatus according to claim 1, wherein said processing means calculates, for one of said focus detection areas belonging to said non-selection area which may be included in said selection area next time, the next charge accumulation time on the basis of the output value and charge accumulation time of the charge accumulation type photoelectric converting means therefor.

4. A focus detecting apparatus according to claim 1, further comprising:

position setting means for setting the position of said selection area in said photographing image field;

said area setting means setting said selection area in said photographing image field on the basis of the position of said selection area set by said position setting means.

5. A focus detecting apparatus according to claim 4, wherein said position setting means has a position setting member capable of arbitrarily setting the position of said selection area in said photographing image field.

6. A focus detecting apparatus according to claim 4, further comprising:

eye-direction detecting means for detecting at which portion of a finder screen a photographer's eye is gazing;

said position setting means setting the position of said selection area on the basis of said photographer's eye direction detected by said eye-direction detecting means.

7. A focus detecting apparatus according to claim 4, further comprising:

two-dimensional photoelectric converting means for receiving a light beam from an object passed through said photo-taking lens; and analyzing means for analyzing the output of said two-dimensional photoelectric converting means and detecting the movement of said object in said photographing image field;

said position setting means setting the position of said selection area on the basis of the movement of said object detected by said analyzing means.

8. A focus detecting apparatus according to claim 4, wherein said position setting means sets the position of the focus detection area which is most related to the result of the focus detection by said focus detecting means as the next position of said selection area.

9. A focus detecting apparatus according to claim 1, wherein said area setting means effects the renewal of the selection area at a predetermined period, and when the current selection area is to be set at a position adjacent to the selection area set the last time, it sets the current selection area so that at least one common focus detection area included in both of the last and current selection areas may exist.

10. A focus detecting apparatus according to claim 1, wherein said area setting means sets the selection area so as to include a plurality of focus detection areas in which the focus detection directions are not parallel to each other.

11. A focus detecting apparatus according to claim 1, further comprising:

size setting means for setting the size of said set area;

said area setting means setting said selection area in accordance with the size set by said size setting means.

12. A focus detecting apparatus according to claim 11, wherein said size setting means has a setting member for setting the size of said set area.

13. A focus detecting apparatus according to claim 11, further comprising:

stop-motion judging means for judging the stop or motion of an object on the basis of the result of the detection by said detecting means;

said size setting means setting the size of said selection area on the basis of the result of the judgment by said stop-motion judging means.

14. A focus detecting apparatus according to claim 11, further comprising:

two-dimensional photoelectric converting means for receiving a light beam from an object passed through said photo-taking lens; and analyzing means for analyzing the output of said two-dimensional photoelectric converting means and detecting any variation in the size and the movement of said object in said photographing image field;

said size setting means setting the size of said selection area on the basis of the variation in the size and the movement of said object detected by said analyzing means.

15. A focus detecting apparatus according to claim 11, further comprising:

eye-direction detecting means for detecting at which portion of a finder screen a photographer's eye is gazing;

said size setting means setting the size of said selection area on the basis of the result of the eye-direction detection by said eye-direction detecting means.

16. A focus detecting apparatus according to claim 11, wherein said size setting means sets the size of said selection area in conformity with the focal length of said photo-taking lens.

17. A focus detecting apparatus according to claim 11, further comprising:

a time setting member for setting the time permitted for focus detection;

said size setting means setting the size of said selection area so that focus detection may be completed by said focus detecting means within said time set by said time setting member.

18. A focus detecting apparatus according to claim 1, further comprising:

number setting means for setting the number of said focus detection areas included in said selection area;

said area setting means setting said selection area so as to include the number of said focus detection areas set by said number setting means.

19. A focus detecting apparatus according to claim 18, wherein said number setting means has a setting member for setting the number of said focus detection areas included in said selection area.

20. A focus detecting apparatus according to claim 18, further comprising:

stop-motion judging means for judging the stop or motion of an object on the basis of the result of the detection by said detecting means;

said area setting means setting the number of said focus detection areas included in said selection area on the basis of the result of the judgment by said stop-motion judging means.

21. A focus detecting apparatus according to claim 18, further comprising:

two-dimensional photoelectric converting means for receiving a light beam from an object passed through said photo-taking lens; and analyzing means for analyzing the output of said two-dimensional photoelectric converting means and detecting any variation in the size and the movement of of said object in said photographing image field;

said number setting means setting the number of said focus detection areas included in said selection area on the basis of the variation in the size and the movement of said object detected by said analyzing means.

22. A focus detecting apparatus according to claim 18, further comprising:

eye-direction detecting means for detecting at which portion of a finder screen a photographer's eye is gazing;

said number setting means setting the number of said focus detection areas included in said selection area on the basis of the result of the eye-direction detection by said eye-direction detecting means.

23. A focus detecting apparatus according to claim 18, wherein said number setting means sets the number of said focus detection areas included in said selection area in conformity with the focal length of said photo-taking lens.

24. A focus detecting apparatus according to claim 18, further comprising:

a time setting member for setting the time permitted for focus detection;

said number setting means setting the number of said focus detection areas included in said selection area so that focus detection may be completed by said focus detecting means within said time set by said time setting member.

25. A focus detecting apparatus according to claim 1, further comprising:

indicating means for indicating said selection area in said photographing image field.

26. A focus detecting apparatus according to claim 25, wherein said indicating means indicates one of the plurality of focus detection areas in said selection area which is most related to the result of the focus detection by said focus detecting means.

27. A focus detecting apparatus according to claim 1, further comprising control means for controlling the charge accumulation in the photoelectric converting means corresponding to the focus detection areas included in said selection area and also in a focus detection area not included in said selection area.

28. A focus detecting apparatus comprising:

charge accumulation type photoelectric converting means provided correspondingly to at least three different focus detection areas set in a photographing image field and having a plurallty of pairs of light receiving portions each for receiving a pair of light beams directed from a corresponding one of said focus detection areas by a focus detecting optical system;

area setting means for setting a selection area including, concurrently, at least two of said focus detection areas in said photographing image field, said area setting means being capable of changing the selection area based on a position of a main object in said photographing image field;

processing means for applying processing to the outputs of the charge accumulation type photoelectric converting means corresponding to said focus detection areas included in said selection area; and focus detecting means for detecting the focus adjusted state of a photo-taking lens based on outputs of only the charge accumulation type photoelectric converting means corresponding to said focus detection areas included in said selection area processed by said processing means.

29. A focus detecting apparatus according to claim 28, further comprising control means for controlling the charge accumulation in the photoelectric converting means corresponding to the focus detection areas included in said selection area and also in a focus detection area not included in said selection area.

30. A focus detecting apparatus comprising:

a charge accumulation type photoelectric converting device provided correspondingly to at least three different focus detection areas set in an image field and having a plurality of pairs of light receiving portions each for receiving a pair of light beams directed from a corresponding one of said focus detecting areas by a focus detecting optical system;

an area setting circuit which sets, concurrently, a selection area and a non-selection area, said selection area including at least two of said focus detection areas and said non-selection area including at least one of said focus detection areas in said image field; and a focus detecting circuit which detects the focus adjusted state of an objective lens based on outputs of the charge accumulation type photoelectric converting device corresponding to said at least two focus detection areas included in said selection area, but not based on outputs of the charge accumulation type photoelectric converting device corresponding to any focus detection area included in said non-selection area.

31. A focus detecting apparatus comprising:

a charge accumulation type photoelectric converting device provided correspondingly to at least three different focus detection areas set in an image field and having a plurality of pairs of light receiving portions each for receiving a pair of light beams directed from a corresponding one of said focus detection areas by a focus detecting optical system;

an area setting circuit which sets a selection area including, concurrently, at least two of said focus detection areas in said image field, said area setting circuit being capable of changing the selection area based on a position of a main object in said image field; and a focus detecting circuit which detects the focus adjusted state of an objective lens based on outputs of only the charge accumulation type photoelectric converting device corresponding to said focus detection areas included in said selection area.

32. A camera provided with a focus detecting apparatus comprising:

a charge accumulation type photoelectric converting device provided correspondingly to at least three different focus detection areas set in a photographing image field and having a plurality of pairs of light receiving portions each for receiving a pair of light beams directed from a corresponding one of said focus detection areas by a focus detecting optical system;

an area setting circuit which sets, concurrently, a selection area and a non-selection area, said selection area including at least two of said focus detection areas and said non-selection area including at least one of said focus detection areas in said photographing image field; and a focus detecting circuit which detects the focus adjusted state of a photo-taking lens based on outputs of the charge accumulation type photoelectric converting device corresponding to said at least two focus detection areas included in said selection area, but not based on outputs of the charge accumulation type photoelectric converting device corresponding to any focus detection area included in said non-selection area.

33. A camera provided with a focus detecting apparatus comprising:

a charge accumulation type photoelectric converting device provided correspondingly to at least three different focus detection areas set in a photographing image field and having a plurality of pairs of light receiving portions each for receiving a pair of light beams directed from a corresponding one of said focus detection areas by a focus detecting optical system;

an area setting circuit which sets a selection area including, concurrently, at least two of said focus detection areas in said photographing image field, said area setting circuit being capable of changing the selection area based on a position of a main object in said photographing image field; and a focus detecting circuit which detects the focus adjusted state of a photo-taking lens based on outputs of only the charge accumulation type photoelectric converting device corresponding to said focus detection areas included in said selection area.

34. A camera provided with a focus detection area display device, comprising:

a photoelectric converting device provided correspondingly to at least three different focus detection areas set in a photographing image field;

an area setting circuit which sets, concurrently, a selection area and a non-selection area, said selection area including at least two of said focus detection areas and said non-selection area including at least one of said focus detection areas in said photographing image field, wherein said two focus detection areas in said selection area have no overlapping portion to each other, and are arranged independently to each other; and a display device for indicating a focus detection area display including said selection area, on said photographing image field, said focus detection area display moving together with a movement of said selection area.

35. A camera provided with a focus detection area display device according to claim 34, wherein said display device comprises one of a liquid crystal and an electrochromic element, and indicates the focus detection area display with overlapping an object image, on said photographing image field.

36. A camera provided with a focus detection area display device according to claim 34, wherein said display device indicates the focus detection area display including all of the at least two of said focus detection areas in said selection area.

37. A focus detecting apparatus comprising:

a charge accumulation type photoelectric converting device corresponding to at least three different focus detection areas set in a photographing image field and having a plurality of pairs of light receiving portions each for receiving a pair of light beams directed from a corresponding one of said focus detecting areas by a focus detecting optical system;

an area setting device for setting concurrently, a selection area and a non-selection area, said selection area including at least two of said focus detection areas, and said non-selection area including at least one of said focus detection areas, in said photographing image field; and a focus detecting device for detecting a focus adjusted state of a photo-taking lens based on outputs of the charge accumulation type photoelectric converting device corresponding to said focus detection areas included in said selection area;

wherein said photoelectric converting device accumulates charges in relation to at least a part of said focus detection areas included in said non-selection area while simultaneously accumulating charges in relation to said focus detection areas included in said selection area.

38. A focus detecting apparatus according to claim 37, wherein said apparatus memorizes the outputs of said charge accumulation type photoelectric converting device belonging to said selection area, and calculates an amount of image shift of the photo-taking lens.

39. A focus detecting apparatus according to claim 37, wherein said apparatus calculates, for one of said focus detection areas belonging to said non-selection area, a next charge accumulation time on the basis of an output value and a charge accumulation time from the charge accumulation type photoelectric converting device corresponding to said one focus detection area.

40. A focus detecting apparatus according to claim 37, further comprising:

a position setting device for setting a position of said selection area in said photographing image field;

said area setting device setting said selection area in said photographing image field on the basis of the position of said selection area set by said position setting device.

41. A focus detecting apparatus according to claim 40, wherein said position setting device has a position setting member capable of arbitrarily setting the position of said selection area in said photographing image field.

42. A focus detecting apparatus according to claim 40, further comprising:

an eye-direction detecting device for detecting at which portion of a finder screen a photographer's eye is gazing;

said position setting device setting the position of said selection area on the basis of said photographer's eye direction detected by said eye-direction detecting device.

43. A focus detecting apparatus according to claim 40, further comprising:

a two-dimensional photoelectric converting device for receiving a light beam from an object which has passed through said photo-taking lens and producing an output in response thereto; and an analyzing device for analyzing the output of said two-dimensional photoelectric converting device and detecting movement of said object in said photographing image field;

said position setting device setting the position of said selection area on the basis of the movement of said object detected by said analyzing device.

44. A focus detecting apparatus according to claim 40, wherein said position setting device sets the position of the focus detection area which is most related to a result of the focus detection by said focus detecting device as a next position of said selection area.

45. A focus detecting apparatus according to claim 37, wherein said area setting device effects renewal of the selection area at a predetermined period, and when the current selection area is to be set at a position adjacent to the selection area set the last time, it sets the current selection area so that at least one common focus detection area included in both of the last and current selection areas may exist.

46. A focus detecting apparatus according to claim 37, wherein said area setting device sets the selection area so as to include a plurality of focus detection areas in which the focus detection directions are not parallel to each other.

47. A focus detecting apparatus according to claim 37, further comprising:

a size setting device for setting a size of said set area;

said area setting device setting said selection area in accordance with the size set by said size setting device.

48. A focus detecting apparatus according to claim 47, wherein said size setting device has a setting member for setting the size of said set area.

49. A focus detecting apparatus according to claim 47, further comprising:

a stop-motion judging device for judging a stop or motion of an object on the basis of a result of detection by said detecting device;

said size setting device setting the size of said selection area on basis of a result of judgement by said stop-motion judging device.

50. A focus detecting apparatus according to claim 47, further, comprising:

a two-dimensional photoelectric converting device for receiving a light beam from an object which has passed through said photo-taking lens; and an analyzing device for analyzing an output of said two-dimensional photoelectric converting device and detecting any variation in the size and movement of said object in said photographing image field;

said size setting device setting the size of said selection area on the basis of the variations in the size and movement of said object detected by said analyzing device.

51. A focus detecting apparatus according to claim 47, further comprising:

an eye-direction detecting device for detecting at which portion of a finder screen a photographer's eye is gazing;

said size setting device setting the size of said selection area on the basis of the result of the eye-direction by said eye-direction detecting device.

52. A focus detecting apparatus according to claim 47, wherein said size setting device sets the size of said selection area in conformity with a focal length of said photo-taking lens.

53. A focus detecting apparatus according to claim 47, further comprising:

a time setting member for setting a time permitted for focus detection;

said size setting device setting the size of said selection area so that focus detection may be completed by said focus detecting device within said time set by said time setting member.

54. A focus detecting apparatus according to claim 37, further comprising:

a number setting device for setting a number of said focus detection areas included in said selection area;

said area setting device setting said selection area so as to include the number of said focus detection areas set by said number setting device.

55. A focus detecting apparatus according to claim 54, wherein said number setting device has a setting member for setting the number of said focus detection areas included in said selection area.

56. A focus detecting apparatus according to claim 54, further comprising:

a stop-motion judging device for judging a stop or motion of an object on the basis of a result of the detection by said detecting device;

said area setting device setting the number of said focus detection areas included in said selection area on the basis of the result of the judgment by said stop-motion judging device.

57. A focus detecting apparatus according to claim 54, further comprising;

a two-dimensional photoelectric converting device for receiving a light beam from an object which has passed through said photo-taking lens; and an analyzing device for analyzing an output of said two-dimensional photoelectric converting device and detecting any variation in size and movement of said object in said photographing image field;

said number setting device setting the number of said focus detection areas included in said selection area on the basis of the variation in the size and the movement of said object detected by said analyzing device.

58. A focus detecting apparatus according to claim 54, further comprising:

an eye-direction detecting device for detecting at which portion of a finder screen a photographer's eye is gazing;

said number setting device setting the number of said focus detection areas included in said selection area on the basis of the result of the eye-direction detection by said eye-direction detecting device.

59. A focus detecting apparatus according to claim 54, wherein said number setting device sets the number of said focus detection areas included in said selection area in conformity with a focal length of said photo-taking lens.

60. A focus detecting apparatus according to claim 54, further comprising:

a time setting member for setting a time permitted for focus detection;

said number setting device setting the number of said focus detection areas included in said selection area so that focus detection may be completed by said focus detecting device within said time set by said time setting member.

61. A focus detecting apparatus according to claim 37, further comprising:

an indicating device for indicating said selection area in said photographing image field.

62. A focus detecting apparatus according to claim 61, wherein said indicating device indicates one of the plurality of focus detection areas in said selection area which is most related to a result of the focus detection by said focus detecting device.

63. A focus detecting apparatus according to claim 37, further comprising a control device for controlling charge accumulation in the photoelectric converting device corresponding to the focus detection areas included in said selection area and in a focus detection area not included in said selection area.

64. A focus detecting apparatus according to claim 37, wherein said non-selection area is adjacent to said selection area.

65. A focus detecting apparatus according to claim 37, further comprising, a movement detecting device for detecting a movement direction of a moving object, said photoelectric converting device accumulating charges in relation to said focus detection area belonging in said non-selected areas existing in the movement direction of the object movement detected by said movement detecting device.

66. A focus detecting apparatus according to claim 39, further comprising a memory, which memorizes a representative value relating to one of a maximum value, a minimum value and an average value of an image output, in relation to said non-selected areas to which said photoelectric conversion device accumulates charges, said representative value being used in a next calculation.

67. A camera provided with a focus detecting apparatus comprising:

a charge accumulation type photoelectric converting device corresponding to at least three different focus detection areas set in a photographing image field and having a plurality of pairs of light receiving portions each for receiving a pair of light beams directed from a corresponding one said focus detecting areas by a focus detecting optical system;

an area setting circuit for setting, concurrently, a selection area and a non-selection area, said selection area including at least two of said focus detection areas, and said non-selection area including at least one of said focus detection areas, in said photographing image field; and a focus detecting device for detecting a focus adjusted state of a photo-taking lens based on outputs of the charge accumulation type photoelectric converting device correspondting to said focus detection areas included in said selection area;

wherein said photoelectric converting device accumulates charges in relation to at least a part of said focus detection areas included in said non-selection area while simultaneously accumulating charges in relation to said focus detection areas included in said selection area.

68. A focus detecting apparatus comprising:

a charge accumulation type photoelectric converting device corresponding to at least three different focus detection areas set in an image field and having a plurality of pairs of light receiving portions each for receiving a pair of light beams directed from a corresponding one of said focus detecting areas by a focus detecting optical system;

an area setting circuit which sets, concurrently, a selection area and a non-selection area, said selection area including at least two of said focus detection areas, and said non-selection area including at least one of said focus detection areas, in said image field; and a focus detecting circuit which detects a focus adjusted state of a photographic lens based on outputs of the charge accumulation type photoelectric converting device corresponding to said at least two focus detection areas included in said selection area, when said plurality of focus detection areas included in said selection area are changed, said area setting circuit determining a new selection area so that there is at least one focus detection area commonly included in both selection areas before being changed and after being changed.

69. A camera provided with a focus detecting apparatus, comprising:

a charge accumulation type photoelectric converting device corresponding to at least three different focus detection areas set in an image field and having a plurality of pairs of light receiving portions each for receiving a pair of light beams directed from a corresponding one of said focus detecting areas by a focus detecting optical system;

an area setting circuit which sets, concurrently, a selection area and a non-selection area, said selection area including at least two of said focus detection areas, and said non-selection area including at least one of said focus detection areas, in said image field; and a focus detecting circuit which detects the focus adjusted state of a photographic lens based on outputs of the charge accumulation type photoelectric converting device corresponding to said at least two focus detection areas included in said selection area, when said plurality of focus detection areas included in said selection area are changed, said area setting circuit determining a new selection area so that there is at least one focus detection area commonly included in both selection areas before being changed and after being changed.

* * * * *